US008858900B2

(12) United States Patent
Galloway

(10) Patent No.: US 8,858,900 B2
(45) Date of Patent: Oct. 14, 2014

(54) PROCESS AND SYSTEM FOR CONVERTING WASTE TO ENERGY WITHOUT BURNING

(75) Inventor: Terry Galloway, Berkeley, CA (US)

(73) Assignee: Intellergy, Inc., Berkeley, CA (US)

( * ) Notice: Subject to any disclaimer, the term of this patent is extended or adjusted under 35 U.S.C. 154(b) by 328 days.

(21) Appl. No.: 12/287,996

(22) Filed: Oct. 14, 2008

(65) Prior Publication Data

US 2012/0277329 A1 Nov. 1, 2012

(51) Int. Cl.

| | |
|---|---|
| *B01J 8/00* | (2006.01) |
| *B01J 8/10* | (2006.01) |
| *C10G 2/00* | (2006.01) |
| *C10K 1/00* | (2006.01) |
| *C10K 1/04* | (2006.01) |
| *C10J 3/00* | (2006.01) |
| *B01J 8/02* | (2006.01) |
| *C01B 3/48* | (2006.01) |
| *C10K 1/02* | (2006.01) |
| *C01B 3/34* | (2006.01) |
| *C10K 1/32* | (2006.01) |
| *C10K 3/04* | (2006.01) |

(52) U.S. Cl.
CPC ........... *C10G 2/32* (2013.01); *B01J 2208/0053* (2013.01); *B01J 8/10* (2013.01); *C10G 2/332* (2013.01); *C01B 2203/0283* (2013.01); *B01J 2208/00752* (2013.01); *C10K 1/002* (2013.01); *C10K 1/04* (2013.01); *C10J 3/007* (2013.01); *B01J 8/006* (2013.01); *C01B 2203/0475* (2013.01); *Y02E 50/18* (2013.01); *B01J 8/0271* (2013.01); *C10G 2300/4081* (2013.01); *C01B 2203/148* (2013.01); *C01B 3/48* (2013.01); *B01J 8/009* (2013.01); *C01B 2203/0894* (2013.01); *B01J 2208/00415* (2013.01); *C01B 2203/0222* (2013.01); *C10K 1/024* (2013.01); *C10G 2300/4043* (2013.01); *B01J 2219/0004* (2013.01); *C01B 2203/062* (2013.01); *C01B 2203/043* (2013.01); *B01J 2208/00309* (2013.01); *C01B 2203/0216* (2013.01); *C01B 3/34* (2013.01); *C10J 2300/1246* (2013.01); *C10J 2300/1853* (2013.01); *C10K 1/32* (2013.01); *C10G 2/30* (2013.01); *C10K 3/04* (2013.01)
USPC ........... 422/629; 422/630; 422/625; 422/626; 422/628; 422/233; 422/236; 422/238

(58) Field of Classification Search
USPC ......... 422/630, 625, 626, 628, 629, 233, 236, 422/238
See application file for complete search history.

(56) References Cited

U.S. PATENT DOCUMENTS

| | | | | |
|---|---|---|---|---|
| 4,881,947 A | * | 11/1989 | Parker et al. | 48/89 |
| 5,620,670 A | * | 4/1997 | Benham et al. | 422/213 |
| 7,220,502 B2 | * | 5/2007 | Galloway | 429/426 |
| 7,753,973 B2 | * | 7/2010 | Galloway | 48/127.1 |

* cited by examiner

*Primary Examiner* — Lessanework Seifu
(74) *Attorney, Agent, or Firm* — John V. Daniluck; Bingham Greenebaum Doll LLP

(57) ABSTRACT

This invention relates to a power recovery process in waste steam/$CO_2$ reformers whereby a waste stream can be made to release energy without having to burn the waste or the syngas. This invention does not make use of fuel cells as its critical component but makes use of highly exothermic chemical reactors using syngas to produce large amounts of heat, such as Fischer-Tropsch. It also relates to control or elimination of the emissions of greenhouse gases in the power recovery process of this invention with the goal of producing energy in the future carbonless world economy. A New Concept for a duplex kiln was developed that has the combined functionality of steam/$CO_2$ reforming, heat transfer, solids removal, filtration, and heat recovery. New methods of carbon-sequestering where the syngas produced by steam/$CO_2$ reforming can be used in Fischer-Tropsch processes that make high-carbon content compounds while recycling the methane and lighter hydrocarbons back to the reformer to further produce syngas at a higher $H_2$/CO ratio.

11 Claims, 7 Drawing Sheets

PROCESS AND SYSTEM FOR CONVERTING WASTE TO ENERGY WITHOUT BURNING

This application involves related subject matter to U.S. Patent Application No. 60/749,306, was filed Dec. 12, 2005, incorporated herein by reference.

FIELD OF THE INVENTION

The invention relates to a process and system in which a waste stream can be made to release energy without having to burn the waste or the syngas and consume oxygen and have large carbon dioxide emissions. At the same time the waste can be converted into a carbon-containing fertilizer, hydrogen fuel, and a carbon-sequestering, high-carbon content product of important commercial value, such as unsaturated, high-density paraffin.

BACKGROUND OF THE INVENTION

The process and system for carrying out the steam/$CO_2$ reforming chemistry to accomplish this has been patented by the author (U.S. Pat. No. 6,187,465, issued Feb. 13, 2001 and CIP U.S. Pat. No. 7,132,183, issued Nov. 7, 2006, filed Jun. 23, 2003) and deals with waste steam/$CO_2$ reformers interfacing to fuel cells. And CIP of patent application Ser. No. 10/719,504 (examined by Ryan/Lewis) filed Nov. 21, 2003 deals with cleaning the syngas produced in waste steam/$CO_2$ reformers interfacing to fuel cells to produce energy without poisoning their sensitive catalysts.

There is a great need to destroy a wide range of waste streams generated around the world and at the same time to convert this carbonaceous waste into useful hydrogen-rich syngas by two methods: (1) to drive a fuel cell and (2) to feed a Fischer-Tropsch unit—both to produce clean energy.

The challenge and problem with fuel cells has been their extreme sensitivity to various unknown chemical poisons at parts per million levels coming from the waste streams from harming the electrochemical catalysts of the high temperature fuel cells. By comparison Flory-Huggins catalysts in Fischer-Tropsch reactors (such as supported iron and cobalt catalysts) are much less sensitive to poisons than fuel cells and are highly exothermic.

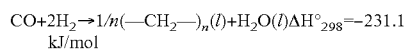

Conversion of syngas to methanol using copper catalysts in the gas phase or liquid-phase catalysts are exothermic and also less sensitive to poisons.

There is syngas methanation that is highly exothermic:

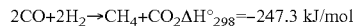

And there are many other highly exothermic reactions that can use syngas and preferably produce useful high-carbon content chemicals of commercial use.

This thermochemistry is well known (R. F. Probstein & R. E. Hicks, "Synthetic Fuels," McGraw-Hill, N.Y., 1982, 490 pp.). And all of these highly exothermic reactors produce high-grade useful energy. So they all can convert syngas with enough exothermicity to make large amounts of electricity, steam and heat. Importantly, these exothermic reactors can substitute very well for fuel cells. Thus, it is the purpose of this patent to cover methods and process systems to convert waste to energy without burning the waste but to sequester the carbon of the waste so carbon gases are not released The composition of the syngas was determined in detail by the author in a recently completed gas test using the Bear Creek Pilot plant where solid waste was steam/$CO_2$ reformed to make syngas. The syngas composition is shown in Table 1 below.

TABLE 1

Results from Pilot Plant Gas Test By Steam/$CO_2$ Reforming Of Solid Waste

| | | | |
|---|---|---|---|
| $H_2$ | Hydrogen | 62.71 | vol % |
| CO | Carbon Monoxide | 18.57 | |
| $CO_2$ | Carbon Dioxide | 10.67 | |
| $CH_4$ | Methane | 7.58 | |
| $C_2H_6$ | Ethane | 0.48 | |
| $C_3$ TO $C_6$ | Propane through hexane | <0.01 | |
| $C_6H_6$ | Benzene | <17 | ppm |
| COS | Carbonyl Sulfide | 4 | ppm |
| $CS_2$ | Carbon Disulfide | 0.05 | ppm |
| $H_2S$ | Hydrogen Sulfide | <5 | ppm |
| $C_{10}H_8$ | Naphthalene | 2.6 | ppb |
| $C_{10}H_7CH_3$ | 2-Methylnaphthalene | ~0.6 | ppb |
| $C_{12}H_8$ | Acenaphthalene | ~0.4 | ppb |
| $C_{12}H_8O$ | Dibenzofuran | 0.36 | ppb |
| PCDF + PCDD | Polychlorinated-dibenzofurans + Dioxins | 0.0041 | ppt TEQ |

The pilot process configuration used to conduct these tests is described in a recent publication (T. R. Galloway, F. H. Schwartz and J. Waidl, "Hydrogen from Steam/$CO_2$ Reforming of Waste," Nat'l Hydrogen Assoc., Annual Hydrogen Conference 2006, Long Beach, Calif. Mar. 12-16, 2006).

What has been found experimentally was that the syngas was very rich in hydrogen and carbon monoxide and also quite pure. For fuel cells the key poisons, such as carbonyl sulfide, hydrogen sulfide, carbon disulfide, hydrogen chloride, and polychlorinated organics were identified. For Fischer-Tropsch, methanol synthesis, methanation, etc., this syngas is very acceptable.

Another important part of power recovery is to reduce the energy losses of the waste-reforming kiln. Previously covered was a process interface involving a conventional kiln, followed by a desulfurizer and a high temperature filter in the CIP of patent application Ser. No. 10/719,504 (examined by Ryan/Lewis) filed Nov. 21, 2003. The problem is that the kiln was operated at a high temperature, followed by an even higher temperature steam/$CO_2$ reformer which is then followed by the desulfurizer and high temperature filter—all energy-inefficient from heat losses from the process units themselves and from the complex of hot process piping. Also this was expensive, as well.

Regarding Fischer-Tropsch, the challenge was to develop a process train where the Fischer-Tropsch unit could produce enough high carbon product, such as high density, unsaturated paraffin wax containing little hydrogen, so that the carbon in the waste feed would be sequestered in this product, without significant carbon emissions leaving the process anywhere else. The Fischer-Tropsch train also had to produce steam for a steam-turbo-generator to make enough electricity to drive the process plant.

SUMMARY OF THE INVENTION

This invention relates to a power recovery process in waste steam/$CO_2$ reformers whereby a waste stream can be made to release energy without having to burn the waste or the syngas and consume oxygen and have large carbon dioxide emissions. This invention does not make use of fuel cells as its critical component but makes use of highly exothermic chemical reactors using syngas to produce large amounts of heat, such as Fischer-Tropsch. It also relates to control or elimination of the emissions of greenhouse gases in the power recovery process of this invention with the goal of producing energy in the future carbonless world economy.

The significant improvement in this process train for power recovery is an improved duplex kiln that combines the functions of the conventional kiln, steam/$CO_2$ reformer, and the high temperature filter into a single unit. The desulfurizer/getter bed can operate at a lower temperature and can follow the duplex kiln.

Further improvements that involve using the above duplex kiln and getter bed in a process train that includes a heat exchanger/steam superheater are disclosed that will rapidly quench-cool the syngas down from 300 to 500° C. (600 to 900° F.) temperature range of the desulfurizer to 150° C. (300° F.). The concept here is to rapidly quench the syngas so that the undesirable heavy hydrocarbon recombination reactions (i.e. "De-Novo") that make dioxins and furans do not have time to form, since they are kinetically limited. These recombination reactions involve multi-step polymerization &/or ring formation and are slowed as the temperatures are lowered.

Next, the Brayton cycle turbine is used to recover energy from the high temperature gas, while cooling it for feeding to both the Fischer-Tropsch unit to produce the high-carbon content product for sequestering the carbon and the shift converter and pressure-swing absorber to produce hydrogen fuel.

As an alternative, a conventional indirectly fired, calcining kiln can be used where the very hot syngas exiting from the steam reformer can heat carbon dioxide gas or air to supply the indirect heat to the kiln to take over from the natural gas burners commonly used.

The Fischer-Tropsch reactor, as discussed above, is highly exothermic and produces vast quantities of high quality steam for operating a conventional steam turbo-generator system for powering the plant.

So what has been accomplished in this invention is the conversion of a waste stream by steam/$CO_2$ reforming to produce a syngas that is used in a Fischer-Tropsch reactor to produce energy and sequester the carbon of the waste at the same time.

It will be obvious for those skilled in the art, to replace the Fischer-Tropsch reactor with other highly exothermic reactors that produce a high-carbon content product for sequestering carbon and produce large amounts of energy. Also interchanging the syngas cleaning process units around while keeping the same functionality are covered under this invention. All such generalizations are covered by this invention.

DETAILED DESCRIPTION OF THE PREFERRED EMBODIMENTS

Figure 1:
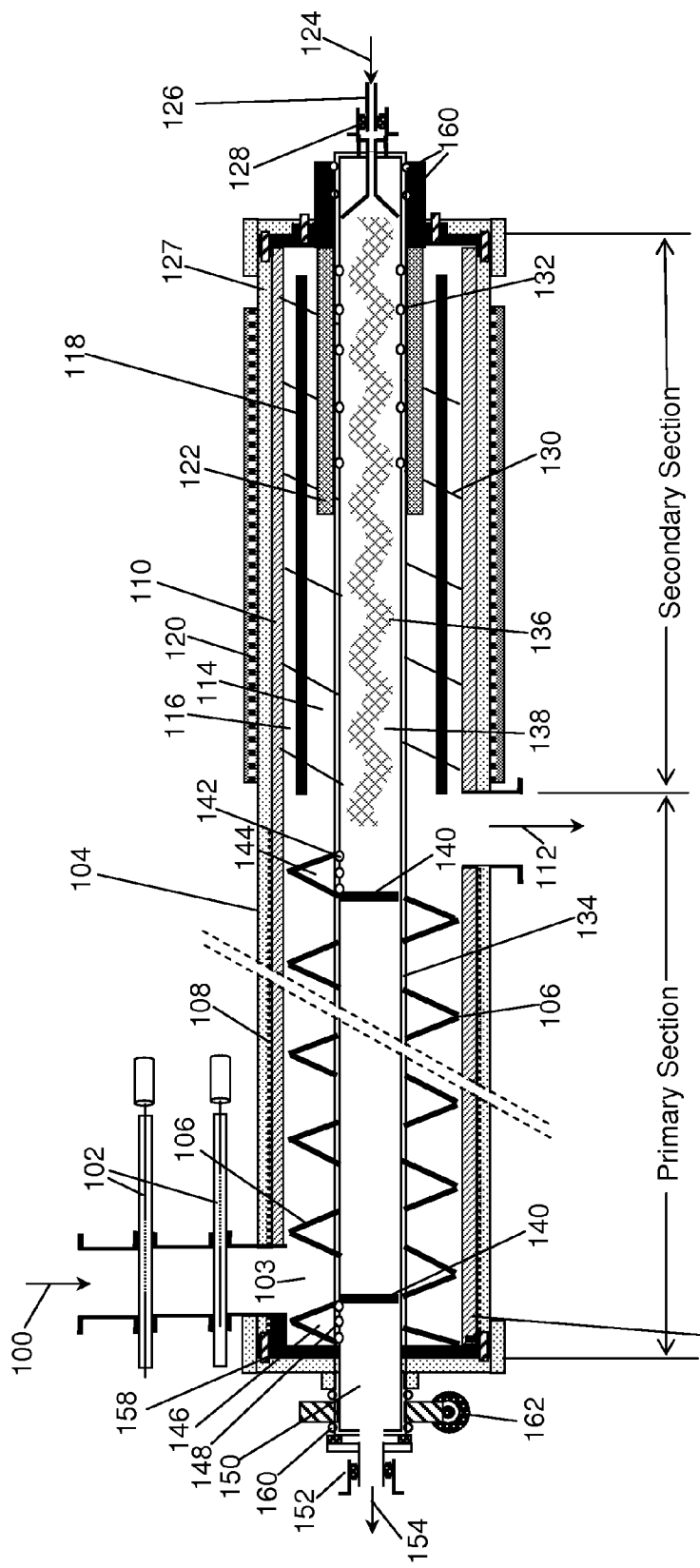
In FIG. 1, there is shown the improved duplex kiln that combines the functions of the conventional kiln, steam/$CO_2$ reformer, and the high temperature filter into a single unit.

In FIG. 1, the functionality of the preferred embodiment of FIG. 1 is combined into a single kiln to increase the thermal efficiency and reduce the cost. This design is referred to as the Duplex Kiln. This new kiln concept combines all the high temperature process components of the embodiment shown in FIG. 1 into a single unit, greatly reducing heat loss and thus achieving very much higher thermal efficiency.

Referring to FIG. 1, the waste stream 100 is fed through a sealed lockhopper 102 down into the internal region 103 of the kiln 104. The lockhopper is of novel design in that these two sliding port rectangular knife gate valves are spaced apart so that the top valve opens and a column of waste is dropped down through this valve, at which point it is then closed, cutting through the column of waste. Then the knife gate valve below is opened dropping the portion of waste captured between these valves is dropped down into the kiln. Next, the bottom valve is closed and the top valve opened, thus repeating the cycling. What is novel is that these sliding port rectangular knife gates have hardened sliding gate edges driven by powerful hydraulic actuators that are capable of cutting through a column of waste, such as municipal solid waste. This is important since the column of waste will be produced by intermittent loading from external sources and will be of varying height depending on how quickly this waste is added to the column. In this way a very intermittent waste stream is converted to a steady stream of regular pulses of fixed amounts of waste are fed into the kiln, making the kiln operation, for all practical measures, a continuous process.

Referring to FIG. 1, once the waste 100 enters the kiln 104, the hollow flight auger 106 moves this portion of waste admitted by the knife gate lockhopper slowly along the kiln from left to right. This waste is heated by very hot gas passing inside of these screw auger flights 106. The outside of the kiln in this region is heated by electrical heat tracing 108 to reduce heat loss. The kiln body 110 itself in this example is 48" in diameter and 22 ft long with the wall made of high temperature alloy, such as Incoloy 800H. The waste is being steam/$CO_2$ reformed in the region 103 of the screw between these hollow flights 106 where the temperatures range from around 200° F. in the feed end at the left to around 900° F. leaving the last screw flight on the right, at which point the solids remaining after reforming drop out at the solids exit, 112.

Referring to FIG. 1, after the syngas leaves the screw flights moving to the right, they enter the annular regions 114 and 116 which are separated by a perforated heavy wall cylinder 118 of Incoloy 800 HT which is heated inductively by the outside coils 120. This syngas moves to the right through this double annular region where it is heated from 480-1050° C. (900 to 1900° F.). Within this annular region are located spiral flights to swirl the gas in a gas cyclone operation for removal of entrained solids. At its highest temperature this very hot syngas passes through a porous alumina filter 122 on which any fine particulate entrained material is deposited. As the solids build up on this porous filter they can be removed by pulsing an external steam source 124 entering through conduit 126 through rotary seal 128. As the solids deposited on this filter 122 are blown off, they are moved to the left by spiral flights 130 to remove these fine solids out the exit pipe 112. The syngas, which is now cleaned of fines, passes through large ports 132 in the central shaft 134. Inside this shaft there are swirl vanes 136 that thorough mix the steam 124 added to this region with the syngas to complete the reforming chemistry. This finished syngas passes through this swirl vane region 138 from right to the left inside the central shaft 134. As this finished syngas leaves the swirl vane region it is blocked by plug 140 at which point the finished syngas passes through large ports 142 in the central to enter into the internal region of the hollow flights 144. This very hot finished syngas at about 1000° C. (1800° F.) is now rapidly cooled as it gives up its sensible heat to the incoming solid waste 100 passing countercurrently in the region 103 outside of these hollow flights 106. Once this finished syngas is cooled to about 150-480° C. (300-900° F.) it passes from the internal volume of the last hollow flight 146 through large ports 148 into the inside of the chamber 150. This chamber 150 is fitted with a rotary seal 152 so the finished cooled syngas passes out of the kiln via conduit 154. The outer shell of the kiln 110 is egg-shaped in cross section 156 to allow ample regions for the syngas to pass outside the hollow flights. This kiln shell is fitted with flanges 158 at both ends that includes bearings 160 through which the internal central shaft 134 rotates. There is a motor drive and gear assembly 162 that rotates the central shaft 134 around which are the hollow flights 106, the annular heated cylinder 118 and its spiral flights 130.

Figure 2:
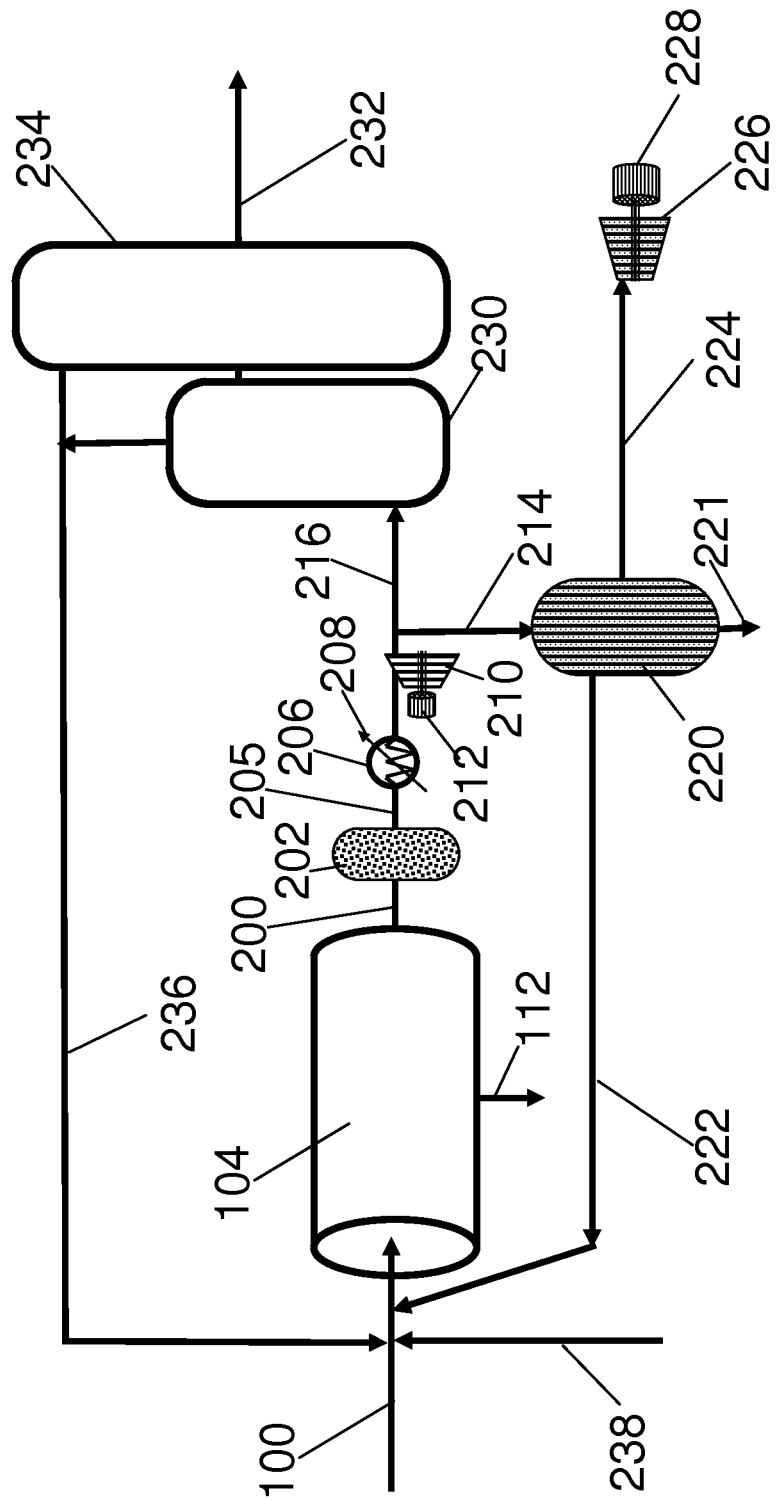
In FIG. 2, is shown how the new concept of a duplex kiln can be followed by a desulfurizer/getter bed, quench heat exchanger for provided superheated steam for the duplex kiln, and the Brayton turbine for generating power by cooling the syngas, which is then fed to both a Fischer-Tropsch reactor and Shift/Pressure Swing Absorption System.

Now referring to FIG. 2, the above kiln 104 is shown interfaced to the shift/PSA unit using its exhaust recycle 236 and the Fischer-Tropsch process 220 recycling the methane and light hydrocarbon gases via 222 back to the steam/$CO_2$ reforming kiln. These streams involving the waste 100, the fuel cell anode exhaust 210 and the Fischer-Tropsch overhead stream 222 are combined with the proper amount of steam 224 to carryout the steam/$CO_2$ reforming inside the kiln 104. Particularly important to note is that these two recycle steams both involve greenhouse gases, $CO_2$ and $CH_4$, which would otherwise be released to the atmosphere. For example, we find a long forgotten reaction, that has not been commercially exploited, can be accomplished. It is:

$$CH_4 + CO_2 \rightarrow 2H_2 + 2CO$$

In our improved process these problem gases are not released to environment but profitably utilized.

This reaction equilibrium favors the $H_2$ and CO at temperatures around or above 700° C. (1300° F.) so that when the syngas moves from the hollow flight section of kiln 104 in FIG. 2 into the double annular regions 114, and 116, which involves temperatures around 1050° C. (1900° F.), so that this reaction is almost 100% completed as the synthesis gas leaves kiln 104 in line 200. Note that this consumes $CO_2$ and produces more syngas that can be used in the fuel cell as well as in Fischer-Tropsch. This reaction is favored at the high temperatures of our steam/$CO_2$ reformer wherein the syngas of $H_2$/CO ratio around 1.0 is produced. Also using our '465 patent and its continuation, the reaction:

$$CH_4 + H_2O \rightarrow 3H_2 + CO$$

can be accomplished in our steam/$CO_2$ reformer to produce a syngas of $H_2$/CO=3, so again we can adjust the $H_2$/CO ratio to whatever Fischer-Tropsch needs (i.e. say 0.7 to 1.4). So recycling this combination of $CO_2$ and $CH_4$ as well as other light hydrocarbons is of significant advantage.

Here, using the empirical formula for typical municipal solid waste, we show two reactions: first the conventional steam reforming using a stoichiometric amount of steam to make just CO and $H_2$.

Referring to FIG. 2, the synthesis gas is moved by the turbo-blower 210 powered by electric motor 212 and divided into streams 214 and 216. Any excess heat from the Fischer-Tropsch process 220 in the form of steam in line 224 can be used to drive a conventional turbine 226 powering electric generator 228 for providing electricity to operate the system as set forth in the examples below.

Example #1

Stoichiometric Steam $$C_1H_{1.67}O_{0.47} + 0.53H_2O \rightarrow CO + 1.36H_2$$

In this case 1 kg of waste will yield 1.45 kg of syngas.

Example #2

Superstoichiometric in $CO_2$ and $C_2H_4$

By contrast, here is the improved reforming reaction which involves a substoichiometric amount of steam but has the light hydrocarbon Fischer-Tropsch and shift/PSA overhead represented for simplicity by $C_2H_4$, plus $CO_2$ and $H_2$, added.

$$C_{11}H_{1.67}O_{0.47} + 0.55C_2H_4 + 0.69H_2 + 1.5CO_2 + 0.04H_2O \rightarrow 3.68CO + 2.67H_2 \qquad [1]$$

In this case, 1 kg of waste will yield 5.11 kg of syngas, which is a very significant 350% increase in the mass of syngas product formed from a given mass of waste.

This achieves the formation only of CO and $H_2$, and thus is stoichiometric which respect to the combination of steam plus $CO_2$ plus $C_2H_4$. Thus, less steam (i.e. sub-stoichiometric) is required and greenhouse-problematic light hydrocarbons and $CO_2$ can be used in large amounts to achieve overall the stoichiometric conversion to syngas desired with a preferred $H_2$/CO ratio around 0.73. $CH_4$, $C_3H_8$ or other light hydrocarbons are actually involved in the real world in combination with $C_2H_4$ shown in the reaction. In a typical Fischer-Tropsch process all of these light hydrocarbons are formed and would be in the recycle. Thus, the use of Fischer-Tropsch is simplified. The $CH_4$ is produced as the major part of the waste light gases coming off the tops of the Fischer-Tropsch gravity separator. No distillation is required. Any other light gases that are also carried along with the waste $CH_4$ can go back to the steam reformer as well.

We believe that it could even be economic to recycle 100% of the $CO_2$ and whatever optimum amount of $CH_4$ from Fischer-Tropsch to make the whole system balance, sequestering all of the $CO_2$ while making useful paraffin wax that is high in carbon content, high in commercial value, and not burned in its lifecycle. So in FIG. 2 the Improved Carbon Sequestration can be accomplished as shown by the carbon balance. Thus, by adjusting the carbon in the Shift/PSA recycle 236 plus the carbon in the Fischer-Tropsch overhead recycle 222, the carbon in the waste 100 is made to just equal the carbon in the Fischer-Tropsch product. So what could be accomplished is the total sequestration of the carbon in the waste by the formation of the high carbon content paraffin wax. It will be obvious to one skilled in the art to identify other Fischer-Tropsch products passing through exit 221 that can be selected that will accomplish this total carbon sequestration. Commercially, there may be an economic optimum situation where one may not want to sequester all of the carbon in the waste, but this example shows that this is theoretically possible with our new concept.

Figure 3:
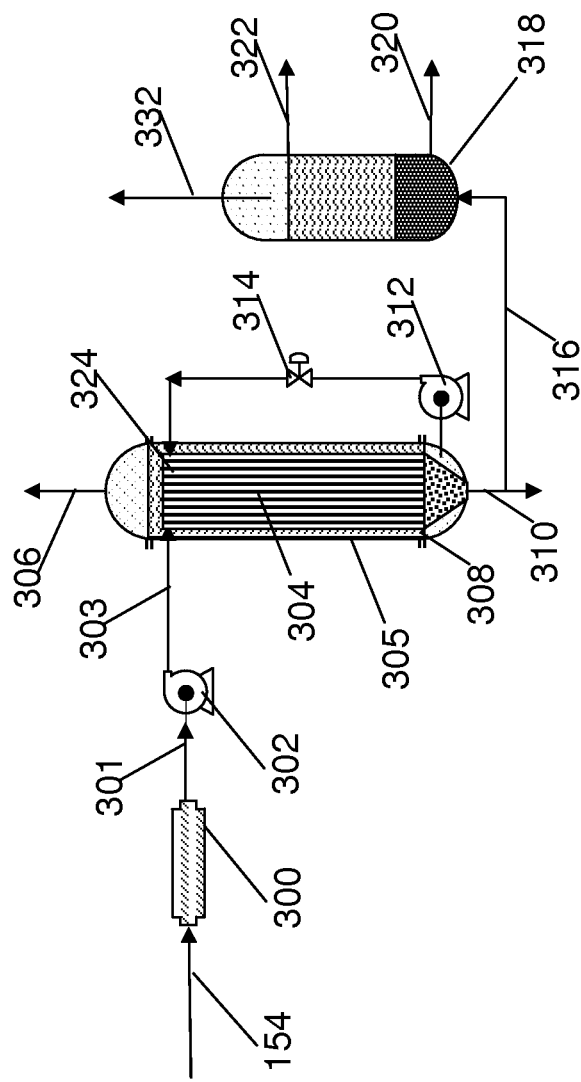
In FIG. 3 is shown the advantage of using a Fischer-Tropsch process consisting only of two units that simply makes the high-carbon product, makes steam and accomplishes sequestration carbon balance in capturing nearly all of the carbon dioxide emissions.

FIG. 3 shows how simplified the Fischer-Tropsch process can become in this new steam/$CO_2$ reforming process of waste conversion with recycle streams. Referring to FIG. 3, the cleaned and warm syngas 154 from the kiln 104 shown in FIG. 2 is passed into an air cooler 300 where it is temperature-controlled to about 180° C. (350° F.) at the exit of the air cooler 301. This stream 301 is then fed to the compressor 302 where the pressure is increased from around one atmosphere (15 psig) to 3.5 MPa (468 psig) at its outlet 303 which feeds the Fischer-Tropsch reactor 305 containing a Fischer-Tropsch catalyst 304 within its vertical tubes 324. These vertical tubes containing catalyst are surrounded with water 308 under pressure and this water boils to maintain the proper temperature. The liquid paraffin formed as desired is circulated by pump 312 at a rate controlled by valve 314. This reactor carries out the synthesis reactions making a range of hydrocarbons from $CH_4$, light hydrocarbons up to heavy hydrocarbon paraffins while releasing a very substantial amount of heat.

The reaction below shows how the syngas produced in reaction [1] above can be used to make high carbon-content products such as high density, unsaturated paraffin wax as a means of sequestering carbon in a product that has significant commercial value. The other compounds formed can be recycled back into reaction [1] so that they are not released to the environment. Also there are some $CO_2$, $H_2$ and $H_2O$ that can be recycled as well from the shift converter 230, and PSA unit 234, with the $H_2$ stream exiting in line 232. Again, $C_2H_4$ is being used to represent the large range of light hydrocarbon gases for simplicity of discussion.

The temperature, pressure, $H_2$/CO ratio of the syngas, and the residence time together control the molecular range of the Fischer-Tropsch products 316 that is then fed into the separator 318. The mixture of hydrocarbons gravimetrically separates here into three fractions: water 320, paraffins 322 and light gases overhead 332. So it can be seen that this is a very simple process, not requiring complex distillation, crystallization, or boiling. And it is this interfacing with the steam/$CO_2$ reforming kiln and the fuel cell that makes such a simplification possible and novel.

Figure 4:
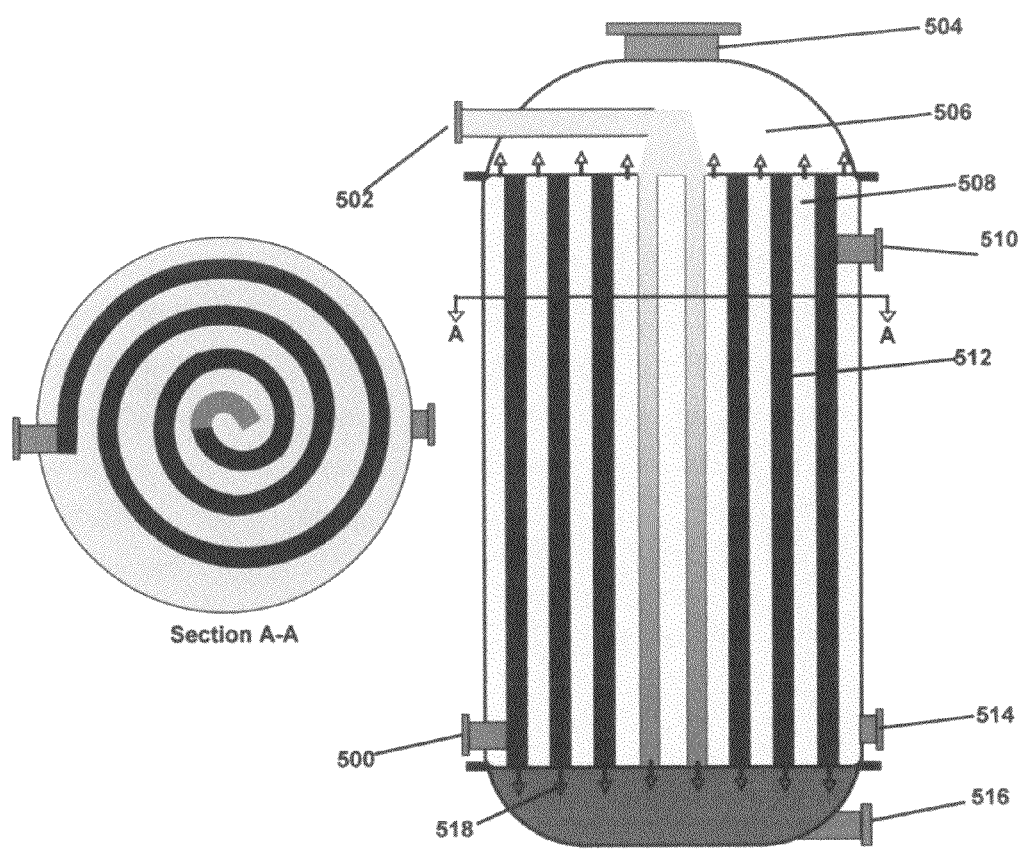
FIG. 4 shows the spiral heat exchange Fischer-Tropsch Reactor.

It will be obvious to one skilled in the art to identify other Fischer-Tropsch reactor concepts different from the conventional catalyst-packed, multi-tube exothermic but isothermal reactor. Such a reactor consists of a spiral heat exchanger where the catalyst is placed in the spiral annular regions (made by Alfa-Laval, particularly common in Europe). Such a design is shown in FIG. 4 that shows the spiral heat exchange Fischer-Tropsch Reactor wherein the syngas feed 500 enters into the spiral annuli 512 that are packed with supported catalyst. The converted syngas consisting of the light gases and some unconverted syngas leaves from nozzle 502. These annuli are immersed in water 508 with its level controlled at the end of the annuli. The exothermic heat boils the water to make steam in disengaging bell 506 which leaves via 504 to feed a steam/turbo generator. The boiler feedwater enters via nozzle 514. At the bottom of the reactor the liquid paraffin wax forms within and drains out the exit of annuli at 518 leaves nozzle 516. Paraffin wax recycle from the separator 318 (shown in FIG. 3), enters the outer spiral annulus through nozzle 510.

Figure 5:
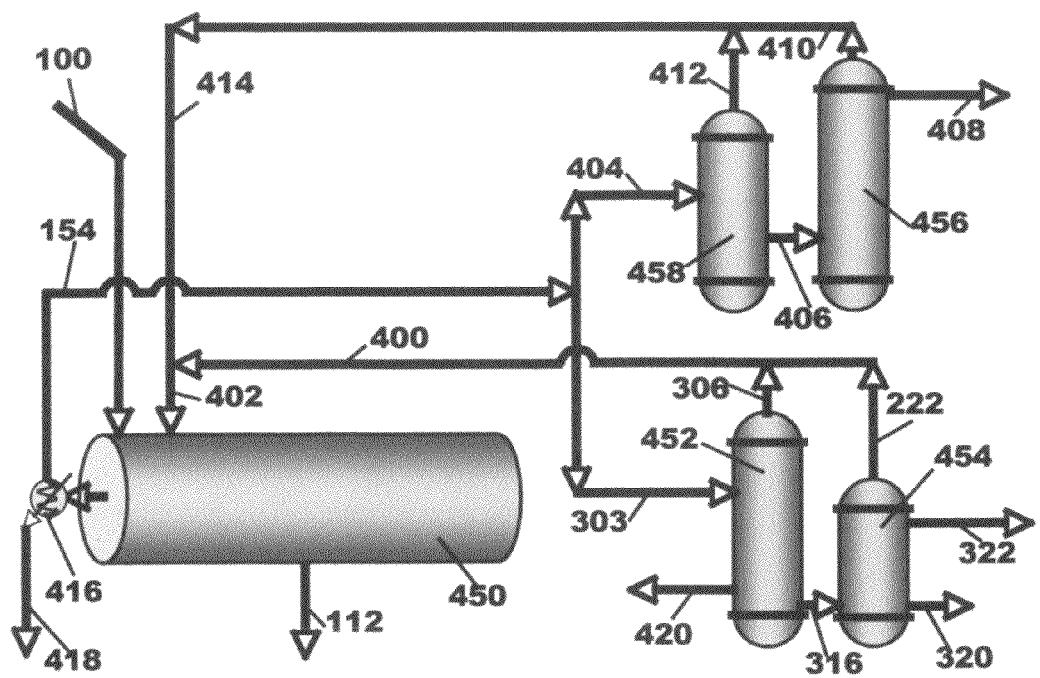
In FIG. 5 is shown how the Fischer-Tropsch process that makes paraffin wax product for carbon sequestration accomplishes recycling the light hydrocarbons consisting of methane, ethane, ethylene, propane, etc. to avoid their emissions as powerful greenhouse gases (i.e. methane) and also recycling the lighter hydrocarbons to help maintain a higher $H_2$/CO ratio of the syngas. It also describes how a waste stream can be made to release energy without having to burn the waste or the syngas. At the same time the waste can be converted into use carbon-containing fertilizer, hydrogen fuel, and a carbon-sequestering, high-carbon content product of important commercial value, such as unsaturated, high-density paraffin wax.

Finally, FIG. 5 describes how a waste stream can be made to release energy without having to burn the waste or the syngas. At the same time the waste can be converted into use carbon-containing fertilizer, hydrogen fuel, and a carbon-sequestering, high-carbon content product of important commercial value, such as unsaturated, high-density paraffin wax.

Referring to FIG. 5, the waste stream enters the process as stream 100 into rotary kiln 450 where it is steam/$CO_2$ reformed via the chemistry in reaction [1] above to form a high-hydrogen content syngas stream 154 where its high temperature heat is used in boiler 416 to produce steam 418, as well as a high carbon content product stream 112 that contains glass and metal as well as a high NPK fertilizer solid particulate of commercial value. The reaction in kiln 450 uses light gases, $CO_2$, and steam recycled as 402 from downstream process units consisting of shift converter 458, pressure-swing absorber 456, Fischer-Tropsch reactor 452 and its paraffin product separator 454. This recycle stream 402 comes from the combined streams 400 made up of 222 and 306 plus stream 414 made up of streams 410 and 412. The syngas 154 produced in kiln 450 is split into two streams 303 and 404, with 303 feeding the Fischer-Tropsch units 452 and 454 producing paraffin product 322 and stream 404 feeding the Shift 458 and PSA 456 that produce hydrogen product 408 and optional $CO_2$. In addition, the Fischer-Tropsch unit 452 is highly exothermic and produces large amounts of steam 420 that can be used to drive a steam turbine to make electricity to run the plant and be exported for sale. Water streams 316 and 320 are used to make up boiler feedwater. So the net result of this linkage and interface of the three process blocks of steam-reforming of waste to the Shift/PSA and the Fischer-Tropsch is to convert the waste to hydrogen fuel and into high-carbon NPK fertilizer and carbon-sequestering paraffin with a huge release of heat. And this is done without burning the waste and without releasing the huge amounts of greenhouse gases typical of a combustion process. This patent teaches the way of the future of destroying waste and producing steam, heat and useful products in the carbonless economy of the future.

Figure 6:
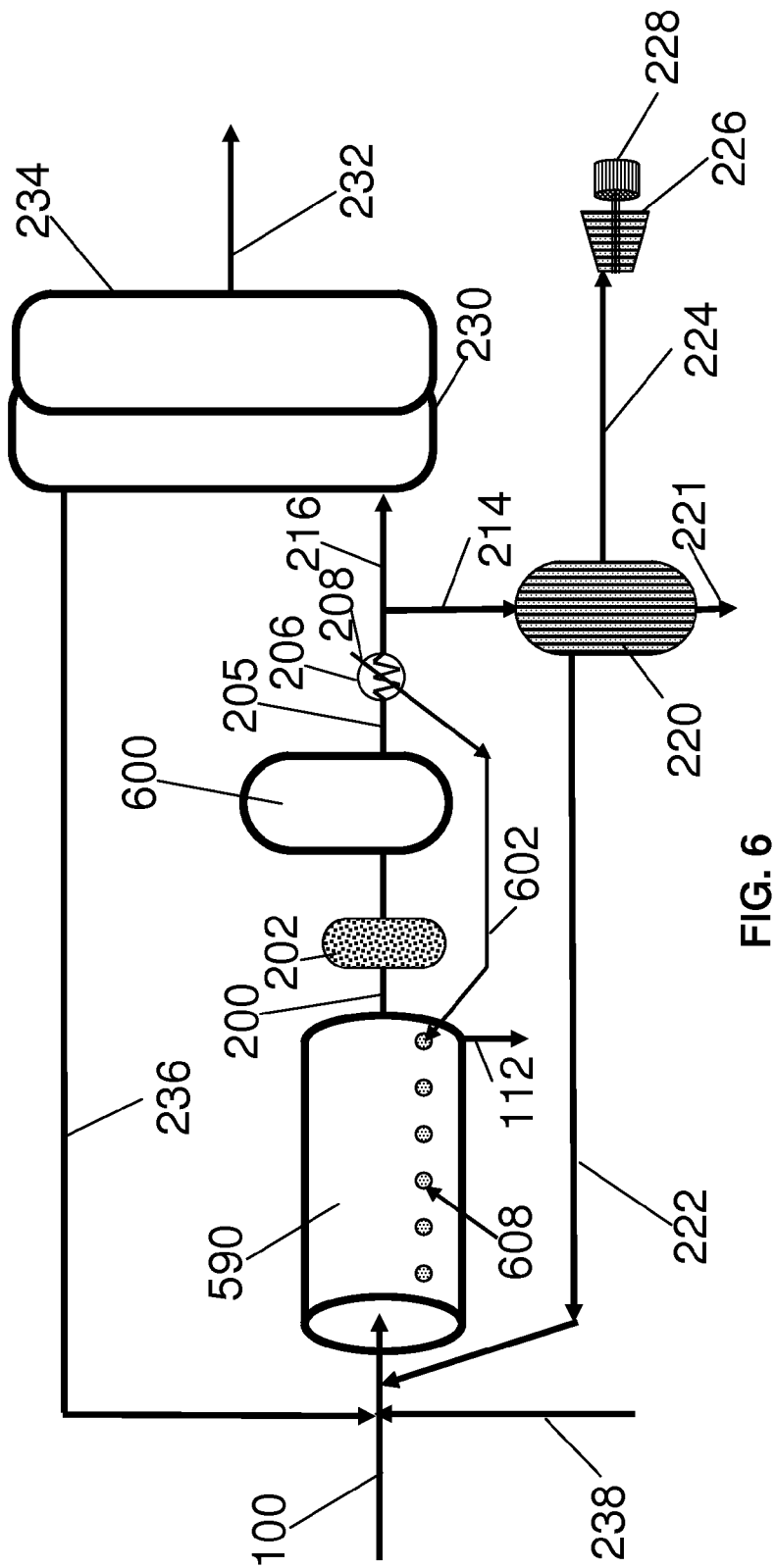
FIG. 6 shows the use of a conventional indirectly fired, calcining kiln where the very hot syngas exiting from the steam reformer can heat carbon dioxide gas or air to supply the indirect heat to the kiln to take over from the natural gas burners commonly used. The process flowsheet layout is given in FIG. 7.

FIG. 6 shows the use of a conventional indirectly fired, calcining kiln where the very hot syngas exiting from the steam reformer can heat carbon dioxide gas or air to supply the indirect heat to the kiln to take over from the natural gas burners commonly used. Now referring to FIG. 6, the above kiln 590 is shown interfaced to the shift/PSA unit using its exhaust recycle 236 and the Fischer-Tropsch reactor 220, which produces products exiting via line 221, and recycles the methane and light hydrocarbon gases via 222 back to the steam/$CO_2$ reforming kiln. These streams involving the waste 100, the light gases in 236 and the Fischer-Tropsch overhead stream 222 are combined with the proper amount of steam in line 224 to carryout the steam/$CO_2$ reforming inside the kiln 590.

This reaction equilibrium favors the $H_2$ and CO at temperatures around or above 700° C. (1300° F.) so that when the syngas moves from the conventional calcining kiln 590 in FIG. 6 into the steam/$CO_2$ reformer, 600, which involves temperatures around 1050° C. (1900° F.), so that this reaction is almost 100% completed. Following this reactor, 600, stream 205 passes into heat exchanger 206 wherein an inert gas, such as $CO_2$ produced elsewhere in the process, or outside air through line 208, is heated by the very hot syngas in steam 205 to be fed via streams 602 into a series of multiple indirect burners 604 of the conventional kiln. These burners, conventionally used for natural gas, would be replaced with an injection jet that would supply the very hot gas directly into the oven-furnace area of the conventional kiln. The rest of the process is the same as in FIG. 2.

Example #3

CO₂ Enriched Syngas

A further improvement in the reforming reaction which involves a substoichiometric amount of steam but has the light hydrocarbon Fischer-Tropsch and shift/PSA overhead represented for simplicity by $C_2H_4$, plus $CO_2$ and $H_2$, added.

$$C_1H_{1.67}O_{0.47}+0.2567C_2H_4+0.2CO_2+1.434H_2O \rightarrow 1.123CO+0.591CO_2+3.029H_2$$

In this case, the reformation reaction is allowed to form $CO_2$ in the syngas, such that the stoichiometric ratio of $(H_2-CO_2)/(CO+CO_2)=1.42$ which is favorable for the Fischer-Tropsch reaction as follows:

$$1.123CO+0.591CO_2+3.029H_2 \rightarrow 0.0757C_{20}H_{30}+0.2CO_2+1.904H_2O$$

This achieves an increase in the amount of paraffin formed and greenhouse-problematic light hydrocarbons and $CO_2$ are entirely recycle back into the reformer, with a small portion of the water condensed as product water. Thus, the use of Fischer-Tropsch is further simplified. As before, the $CH_4$ is produced as the major part of the waste light gases coming off the tops of the Fischer-Tropsch gravity separator. No distillation is required. Any other light gases that are also carried along with the waste $CH_4$ can go back to the steam reformer as well. The important result is that there are no $CO_2$ emissions since the $CO_2$ formation in the Fischer-Tropsch is entirely recycled back into the reformer.

So in FIG. 2 what has been achieved in this case is the entire elimination (i.e. stream 216 is zero) of the Shift/PSA process step at a capital savings. Likewise, in FIG. 5, stream 404 is zero. So what is accomplished in this case is the total sequestration of the carbon in the waste by the formation of the high carbon content paraffin wax. It will be obvious to one skilled in the art to identify other Fischer-Tropsch products that can be selected that will accomplish this total carbon sequestration. Commercially, there may be an economic optimum situation where one may not want to sequester all of the carbon in the waste, but this example shows that this is theoretically possible with our new concept.

Example #4

Process Flowsheet Mass Balance

The process flowsheet layout based on FIG. 5, but with all the process details, was completed and the mass balance done where the flow split of sending syngas to Shift/PSA system and to Fischer-Tropsch was varied. The chemistry within the steam reformer was given in reaction [1] above and in the Fischer-Tropsch unit in reaction [2] above. The results have been summarized in Table 2 below, showing how the products of the waste-to-energy plant, such as hydrogen, water, carbon dioxide and paraffin can be varied depending on the needs of the customer and the marketplace. The case is for wet waste with 15% water and a scale of 4 tonnes/day.

TABLE 2

| The Process Choices Set the Products That Are Made | | | | | | | |
|---|---|---|---|---|---|---|---|
| Shift PSA % | Fischer Tropsch % | H₂ Re-cycle | H₂ Kg/hr | Water Kg/hr | CO₂ Kg/hr | Paraffin Kg/hr | Net Electricity kWe |
| 62 | 38 | Low | 490 | −1547 | 6587 | 859 | 185 |
| 62 | 38 | Hi | 395 | −922 | 5823 | 1093 | 235 |
| 50 | 50 | Hi | 254 | 0 | 4096 | 1441 | 310 |
| 38 | 62 | Hi | 232 | 229 | 4416 | 1526 | 328 |
| 19 | 81 | Hi | 46 | 1475 | 2888 | 1984 | 426 |
| 0 | 100 | Low | 0 | 2264 | 1928 | 2290 | 492 |
| 0 | 100 | Hi | 0 | 3842 | 0 | 2875 | 618 |
| 0 | 100 | OptCO₂ | 0 | 1594 | 0 | 3851 | 861 |

As the process option is shifted more toward Fischer-Tropsch, more paraffin, water, and electricity products are made and less hydrogen fuel produced. With all Fischer-Tropsch, no hydrogen and no carbon dioxide are produced and the amount of water, paraffins, and electricity are maximized. The electricity is a net number, after the internal electricity consumption within the plant is removed and used. The last line in Table 2 covers the case presented in Example #3, showing a great increase in Fischer-Tropsch product as well as electricity generated.

Example #5

Process Flowsheet Heat & Mass Balance for Maximum Hydrogen

Figure 7:
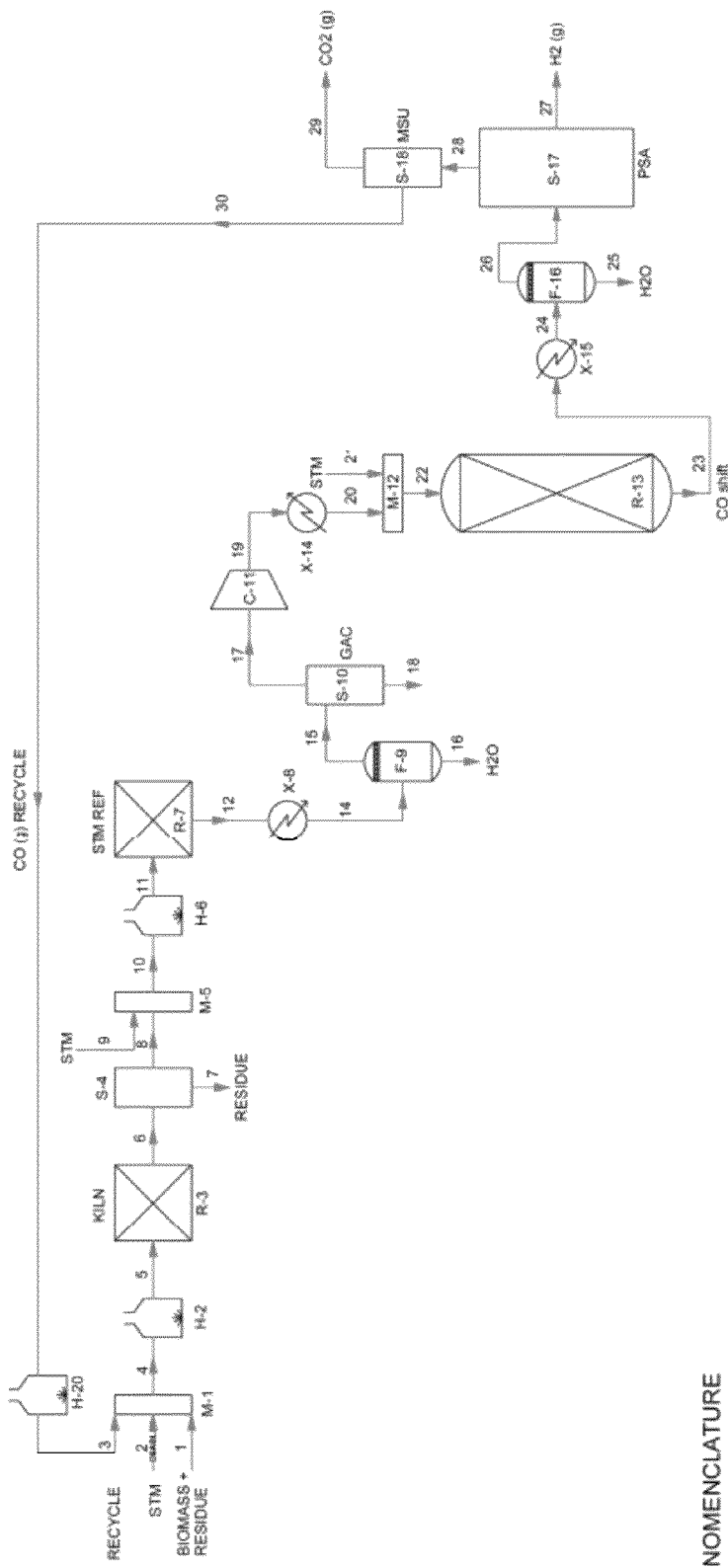

The process flowsheet layout is given in FIG. 7.
The detailed heat and mass balance for the Process flowsheet for maximizing hydrogen production using a cellulose feed is given below:

| | STREAM SUMMARY - Cellulose | | | |
|---|---|---|---|---|
| Stream Number | | 1 | 3 | 4 |
| Stream Name | | Strm 1 | Strm 3 | Strm 4 |
| Thermo Method Option | | GLOBAL | GLOBAL | GLOBAL |
| Vapor Fraction | | 0 | 1 | 0.2441006 |
| Temperature | C. | 25 | 50 | 23.97223 |
| Pressure | kg/cm2 | 1.18822 | 18.30545 | 1.18822 |
| Enthalpy | kcal/hr | −568658.428 | 5939.92631 | −562718.501 |
| Entropy | kcal/K/hr | −1601.801 | −55.70444 | −1562.611 |
| Vapor Density | kg/m3 | | 7.08434 | 0.5120275 |
| Liquid 1 Density | kg/m3 | 1145.39015 | | 1145.55729 |
| Liquid 1 Specific Gravity | 60 F@STP | 1.14771 | | 1.14767 |
| Vapor Cp | kcal/kgmo/C. | | 7.00204 | 6.96086 |
| Vapor Cv | kcal/kgmo/C. | | 4.97593 | 4.97023 |
| Liquid 1 Cp | kcal/kgmo/C. | 74.1567 | | 73.88081 |
| Vapor Viscosity | cP | | 0.012585 | 0.0115689 |

STREAM SUMMARY - Cellulose

| | | | | |
|---|---|---|---|---|
| Liquid 1 Viscosity | cP | 1.35416 | | 1.3574 |
| Vapor Thermal Conductivity | kcal/m/hr/C. | | 0.0869059 | 0.0769098 |
| Liquid 1 Thermal Conductivity | kcal/m/hr/C. | 0.0433377 | | 0.0434341 |
| Vapor Flowrate | m3v(NTP)/hr | | 382.50232 | 391.4952 |
| Liquid 1 Flowrate | m3l(NTP)/hr | 0.6580313 | | 0.6579975 |
| Liquid 2 Flowrate | m3l(NTP)/hr | 249.06799 | | 247.15388 |
| Molecular Weight | | 31.1575 | 10.6878 | 26.2756 |
| Molar Flowrate | kgmol/hr | 54.4973 | 17.0678 | 71.5652 |
| Mass Flowrate | kg/hr | 1697.999625 | 182.4172328 | 1880.418569 |
| Molar Flowrate By Component | | | | |
| 200: D-Glucose | kgmol/hr | 0 | 0 | 0 |
| 201: Cellubiose | kgmol/hr | 2.20858 | 4.402E−15 | 2.20858 |
| 1245: SODIUM CHLORIDE | kgmol/hr | 0 | 0 | 0 |
| 62: WATER | kgmol/hr | 52.2888 | 0.043561 | 52.3323 |
| 48: CARBON MONOXIDE | kgmol/hr | 0 | 5.66596 | 5.66596 |
| 1: HYDROGEN | kgmol/hr | 0 | 11.3563 | 11.3563 |
| 2: METHANE | kgmol/hr | 0 | 0.002054 | 0.002054 |
| 49: CARBON DIOXIDE | kgmol/hr | 0 | 0 | 0 |
| 65: ACETYLENE | kgmol/hr | 0 | 0 | 0 |
| 40: BENZENE | kgmol/hr | 0 | 0 | 0 |
| 3: ETHANE | kgmol/hr | 0 | 1.442E−10 | 1.442E−10 |
| 4: PROPANE | kgmol/hr | 0 | 0 | 0 |
| 22: ETHYLENE | kgmol/hr | 0 | 1.332E−09 | 1.332E−09 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 0 | 9.511E−16 | 9.511E−16 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 0 | 1.797E−16 | 1.797E−16 |
| 3114: 2-BUTYNE | kgmol/hr | 0 | 1.76E−09 | 1.76E−09 |
| Total | kgmol/hr | 54.4973 | 17.0678 | 71.5652 |
| Molar Composition By Component | | | | |
| 200: D-Glucose | molar % | 0 | 0 | 0 |
| 201: Cellubiose | molar % | 4.05264114 | 2.57913E−14 | 3.086108891 |
| 1245: SODIUM CHLORIDE | molar % | 0 | 0 | 0 |
| 62: WATER | molar % | 95.94750566 | 0.255223286 | 73.12534584 |
| 48: CARBON MONOXIDE | molar % | 0 | 33.1967799 | 7.91719998 |
| 1: HYDROGEN | molar % | 0 | 66.53640188 | 15.8684668 |
| 2: METHANE | molar % | 0 | 0.012034357 | 0.00287011 |
| 49: CARBON DIOXIDE | molar % | 0 | 0 | 0 |
| 65: ACETYLENE | molar % | 0 | 0 | 0 |
| 40: BENZENE | molar % | 0 | 0 | 0 |
| 3: ETHANE | molar % | 0 | 8.44866E−10 | 2.01495E−10 |
| 4: PROPANE | molar % | 0 | 0 | 0 |
| 22: ETHYLENE | molar % | 0 | 7.80417E−09 | 1.86124E−09 |
| 1088: PHENOL | molar % | 0 | 0 | 0 |
| 45: ETHYLBENZENE | molar % | 0 | 0 | 0 |
| 23: PROPYLENE | molar % | 0 | 5.57248E−15 | 1.329E−15 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 0 | 1.05286E−15 | 2.511E−16 |
| 3114: 2-BUTYNE | molar % | 0 | 1.03118E−08 | 2.4593E−09 |
| Total | molar % | 100 | 100 | 100 |

| | | | | |
|---|---|---|---|---|
| Stream Number | | 5 | 6 | 7 |
| Stream Name | | Strm 5 | Strm 6 | Strm 7 |
| Thermo Method Option | | GLOBAL | GLOBAL | GLOBAL |
| Vapor Fraction | | 1 | 1 | 1 |
| Temperature | C. | 500 | 500 | 500 |
| Pressure | kg/cm2 | 1.15309 | 1.15309 | 1.15309 |
| Enthalpy | kcal/hr | 410945.746 | 433890.844 | 18334.3418 |
| Entropy | kcal/K/hr | 929.212 | 1113.85 | 34.89752 |
| Vapor Density | kg/m3 | 0.4624083 | 0.351273 | 6.12671 |
| Liquid 1 Density | kg/m3 | | | |
| Liquid 1 Specific Gravity | 60 F@STP | | | |
| Vapor Cp | kcal/kgmo/C. | 13.60159 | 10.36102 | 167.62174 |
| Vapor Cv | kcal/kgmo/C. | 11.60822 | 8.37071 | 165.50288 |
| Liquid 1 Cp | kcal/kgmo/C. | | | |

STREAM SUMMARY - Cellulose

| | | | | |
|---|---|---|---|---|
| Vapor Viscosity | cP | 0.026881 | 0.0258333 | 0.0166158 |
| Liquid 1 Viscosity | cP | | | |
| Vapor Thermal Conductivity | kcal/m/hr/C. | 0.0914342 | 0.0974512 | 0.0383433 |
| Liquid 1 Thermal Conductivity | kcal/m/hr/C. | | | |
| Vapor Flowrate | m3v(NTP)/hr | 1603.82705 | 2110.29555 | 7.07083 |
| Liquid 1 Flowrate | m3l(NTP)/hr | | | |
| Liquid 2 Flowrate | m3l(NTP)/hr | | | |
| Molecular Weight | | 26.2756 | 19.9695 | 342.3019 |
| Molar Flowrate | kgmol/hr | 71.5652 | 94.1646 | 0.315511 |
| Mass Flowrate | kg/hr | 1880.418569 | 1880.41998 | 108.0000148 |

Molar Flowrate By Component

| | | | | |
|---|---|---|---|---|
| 200: D-Glucose | kgmol/hr | 0 | 0 | 0 |
| 201: Cellubiose | kgmol/hr | 2.20858 | 0.445562 | 0.315511 |
| 1245: SODIUM CHLORIDE | kgmol/hr | 0 | 0 | 0 |
| 62: WATER | kgmol/hr | 52.3323 | 42.2031 | 0 |
| 48: CARBON MONOXIDE | kgmol/hr | 5.66596 | 2.08022 | 0 |
| 1: HYDROGEN | kgmol/hr | 11.3563 | 24.9749 | 0 |
| 2: METHANE | kgmol/hr | 0.002054 | 7.81226 | 0 |
| 49: CARBON DIOXIDE | kgmol/hr | 0 | 16.5541 | 0 |
| 65: ACETYLENE | kgmol/hr | 0 | 5.637E−12 | 0 |
| 40: BENZENE | kgmol/hr | 0 | 5.338E−16 | 0 |
| 3: ETHANE | kgmol/hr | 1.442E−10 | 0.00007558 | 0 |
| 4: PROPANE | kgmol/hr | 0 | 0 | 0 |
| 22: ETHYLENE | kgmol/hr | 1.332E−09 | 5.602E−07 | 0 |
| 1088: PHENOL | kgmol/hr | 0 | 1.121E−15 | 0 |
| 45: ETHYLBENZENE | kgmol/hr | 0 | 0 | 0 |
| 23: PROPYLENE | kgmol/hr | 9.511E−16 | 2.044E−10 | 0 |
| 6: N-BUTANE | kgmol/hr | 0 | 7.099E−14 | 0 |
| 5: I-BUTANE | kgmol/hr | 0 | 4.108E−14 | 0 |
| 27: I-BUTENE | kgmol/hr | 0 | 1.714E−14 | 0 |
| 27: I-BUTENE | kgmol/hr | 0 | 1.714E−14 | 0 |
| 66: PROPYNE | kgmol/hr | 1.797E−16 | 7.64E−15 | 0 |
| 3114: 2-BUTYNE | kgmol/hr | 1.76E−09 | 0.094368 | 0 |
| Total | kgmol/hr | 71.5652 | 94.1646 | 0.315511 |

Molar Composition By Component

| | | | | |
|---|---|---|---|---|
| 200: D-Glucose | molar % | 0 | 0 | 0 |
| 201: Cellubiose | molar % | 3.086108891 | 0.473173571 | 100 |
| 1245: SODIUM CHLORIDE | molar % | 0 | 0 | 0 |
| 62: WATER | molar % | 73.12534584 | 44.81843495 | 0 |
| 48: CARBON MONOXIDE | molar % | 7.91719998 | 2.209131669 | 0 |
| 1: HYDROGEN | molar % | 15.8684668 | 26.52259979 | 0 |
| 2: METHANE | molar % | 0.00287011 | 8.29638739 | 0 |
| 49: CARBON DIOXIDE | molar % | 0 | 17.57996105 | 0 |
| 65: ACETYLENE | molar % | 0 | 5.98633E−12 | 0 |
| 40: BENZENE | molar % | 0 | 5.6688E−16 | 0 |
| 3: ETHANE | molar % | 2.01495E−10 | 8.02637E−05 | 0 |
| 4: PROPANE | molar % | 0 | 0 | 0 |
| 22: ETHYLENE | molar % | 1.86124E−09 | 5.94916E−07 | 0 |
| 1088: PHENOL | molar % | 0 | 1.19047E−15 | 0 |
| 45: ETHYLBENZENE | molar % | 0 | 0 | 0 |
| 23: PROPYLENE | molar % | 1.329E−15 | 2.17067E−10 | 0 |
| 6: N-BUTANE | molar % | 0 | 7.53893E−14 | 0 |
| 5: I-BUTANE | molar % | 0 | 4.36257E−14 | 0 |
| 27: I-BUTENE | molar % | 0 | 1.82022E−14 | 0 |
| 27: I-BUTENE | molar % | 0 | 1.82022E−14 | 0 |
| 66: PROPYNE | molar % | 2.511E−16 | 8.11345E−15 | 0 |
| 3114: 2-BUTYNE | molar % | 2.4593E−09 | 0.100216005 | 0 |
| Total | molar % | 100 | 100 | 100 |

| | | | | |
|---|---|---|---|---|
| Stream Number | | 8 | 9 | 10 |
| Stream Name | | Strm 8 | Strm 9 | Strm 10 |
| Thermo Method Option | | GLOBAL | CHANGED | GLOBAL |
| Vapor Fraction | | 1 | 1 | 1 |
| Temperature | C. | 500 | 267 | 499.83311 |
| Pressure | kg/cm2 | 1.15309 | 1.03323 | 1.03323 |
| Enthalpy | kcal/hr | 415533.433 | 121.05274 | 415654.486 |
| Entropy | kcal/K/hr | 1075.271 | 0.1986506 | 1096.144 |
| Vapor Density | kg/m3 | 0.3322084 | 0.4077036 | 0.2977284 |
| Liquid 1 Density | kg/m3 | | | |
| Liquid 1 Specific Gravity | 60 F@STP | | | |
| Vapor Cp | kcal/kgmo/C. | 9.83285 | 8.59419 | 9.83058 |
| Vapor Cv | kcal/kgmo/C. | 7.84266 | 6.57159 | 7.84075 |

| STREAM SUMMARY - Cellulose | | | | |
|---|---|---|---|---|
| Liquid 1 Cp | kcal/kgmo/C. | | | |
| Vapor Viscosity | cP | 0.0253123 | 0.0189224 | 0.0253076 |
| Liquid 1 Viscosity | cP | | | |
| Vapor Thermal Conductivity | kcal/m/hr/C. | 0.0985838 | 0.0343274 | 0.0985339 |
| Liquid 1 Thermal Conductivity | kcal/m/hr/C. | | | |
| Vapor Flowrate | m3v(NTP)/hr | 2103.22472 | 1.24398 | 2104.4687 |
| Liquid 1 Flowrate | m3l(NTP)/hr | | | |
| Liquid 2 Flowrate | m3l(NTP)/hr | | | |
| Molecular Weight | | 18.8858 | 18.0153 | 18.8853 |
| Molar Flowrate | kgmol/hr | 93.849 | 0.055508 | 93.9046 |
| Mass Flowrate | kg/hr | 1772.413444 | 0.999993272 | 1773.416542 |
| Molar Flowrate By Component | | | | |
| 200: D-Glucose | kgmol/hr | 0 | 0 | 0 |
| 201: Cellubiose | kgmol/hr | 0.130051 | 0 | 0.130051 |
| 1245: SODIUM CHLORIDE | kgmol/hr | 0 | 0 | 0 |
| 62: WATER | kgmol/hr | 42.2031 | 0.055508 | 42.2586 |
| 48: CARBON MONOXIDE | kgmol/hr | 2.08022 | 0 | 2.08022 |
| 1: HYDROGEN | kgmol/hr | 24.9749 | 0 | 24.9749 |
| 2: METHANE | kgmol/hr | 7.81226 | 0 | 7.81226 |
| 49: CARBON DIOXIDE | kgmol/hr | 16.5541 | 0 | 16.5541 |
| 65: ACETYLENE | kgmol/hr | 5.637E−12 | 0 | 5.637E−12 |
| 40: BENZENE | kgmol/hr | 5.338E−16 | 0 | 5.338E−16 |
| 3: ETHANE | kgmol/hr | 0.00007558 | 0 | 0.00007558 |
| 4: PROPANE | kgmol/hr | 0 | 0 | 0 |
| 22: ETHYLENE | kgmol/hr | 5.602E−07 | 0 | 5.602E−07 |
| 1088: PHENOL | kgmol/hr | 1.121E−15 | 0 | 1.121E−15 |
| 45: ETHYLBENZENE | kgmol/hr | 0 | 0 | 0 |
| 23: PROPYLENE | kgmol/hr | 2.044E−10 | 0 | 2.044E−10 |
| 6: N-BUTANE | kgmol/hr | 7.099E−14 | 0 | 7.099E−14 |
| 5: I-BUTANE | kgmol/hr | 4.108E−14 | 0 | 4.108E−14 |
| 27: I-BUTENE | kgmol/hr | 1.714E−14 | 0 | 1.714E−14 |
| 27: I-BUTENE | kgmol/hr | 1.714E−14 | 0 | 1.714E−14 |
| 66: PROPYNE | kgmol/hr | 7.64E−15 | 0 | 7.64E−15 |
| 3114: 2-BUTYNE | kgmol/hr | 0.094368 | 0 | 0.094368 |
| Total | kgmol/hr | 93.849 | 0.055508 | 93.9046 |
| Molar Composition By Component | | | | |
| 200: D-Glucose | molar % | 0 | 0 | 0 |
| 201: Cellubiose | molar % | 0.138574732 | 0 | 0.138492683 |
| 1245: SODIUM CHLORIDE | molar % | 0 | 0 | 0 |
| 62: WATER | molar % | 44.96915257 | 100 | 45.00162931 |
| 48: CARBON MONOXIDE | molar % | 2.216560645 | 0 | 2.215248241 |
| 1: HYDROGEN | molar % | 26.61179128 | 0 | 26.5960347 |
| 2: METHANE | molar % | 8.324286886 | 0 | 8.319358157 |
| 49: CARBON DIOXIDE | molar % | 17.6390798 | 0 | 17.62863587 |
| 65: ACETYLENE | molar % | 6.00646E−12 | 0 | 6.0029E−12 |
| 40: BENZENE | molar % | 5.68786E−16 | 0 | 5.68449E−16 |
| 3: ETHANE | molar % | 8.05336E−05 | 0 | 8.04859E−05 |
| 4: PROPANE | molar % | 0 | 0 | 0 |
| 22: ETHYLENE | molar % | 5.96916E−07 | 0 | 5.96563E−07 |
| 1088: PHENOL | molar % | 1.19447E−15 | 0 | 1.19376E−15 |
| 45: ETHYLBENZENE | molar % | 0 | 0 | 0 |
| 23: PROPYLENE | molar % | 2.17797E−10 | 0 | 2.17668E−10 |
| 6: N-BUTANE | molar % | 7.56428E−14 | 0 | 7.5598E−14 |
| 5: I-BUTANE | molar % | 4.37724E−14 | 0 | 4.37465E−14 |
| 27: I-BUTENE | molar % | 1.82634E−14 | 0 | 1.82526E−14 |
| 27: I-BUTENE | molar % | 1.82634E−14 | 0 | 1.82526E−14 |
| 66: PROPYNE | molar % | 8.14074E−15 | 0 | 8.13592E−15 |
| 3114: 2-BUTYNE | molar % | 0.100553016 | 0 | 0.10049348 |
| Total | molar % | 100 | 100 | 100 |

| Stream Number | | 11 | 12 | 14 |
|---|---|---|---|---|
| Stream Name | | Strm 11 | Strm 12 | Strm 14 |
| Thermo Method Option | | GLOBAL | GLOBAL | GLOBAL |
| Vapor Fraction | | 1 | 1 | 0.6603743 |
| Temperature | C. | 875 | 875 | 4.4 |
| Pressure | kg/cm2 | 0.9981011 | 0.9981011 | 0.894778 |
| Enthalpy | kcal/hr | 784222.539 | 817911.152 | −407395.817 |
| Entropy | kcal/K/hr | 1489.791 | 1599.197 | −1013.643 |
| Vapor Density | kg/m3 | 0.193587 | 0.1609311 | 0.551586 |
| Liquid 1 Density | kg/m3 | | | 1037.15161 |
| Liquid 1 Specific Gravity | 60 F@STP | | | 0.9999917 |
| Vapor Cp | kcal/kgmo/C. | 11.06725 | 9.15389 | 7.20069 |

STREAM SUMMARY - Cellulose

| | | | | |
|---|---|---|---|---|
| Vapor Cv | kcal/kgmo/C. | 9.07945 | 7.16653 | 5.2086 |
| Liquid 1 Cp | kcal/kgmo/C. | | | |
| Vapor Viscosity | cP | 0.0335965 | 0.032694 | 0.0119112 |
| Liquid 1 Viscosity | cP | | | 1.54882 |
| Vapor Thermal Conductivity | kcal/m/hr/C. | 0.1559868 | 0.1819838 | 0.0642739 |
| Liquid 1 Thermal Conductivity | kcal/m/hr/C. | | | 0.4896245 |
| Vapor Flowrate | m3v(NTP)/hr | 2104.4687 | 2531.34933 | 1671.63813 |
| Liquid 1 Flowrate | m3l(NTP)/hr | | | |
| Liquid 2 Flowrate | m3l(NTP)/hr | | | 182.78458 |
| Molecular Weight | | 18.8853 | 15.7005 | 15.7005 |
| Molar Flowrate | kgmol/hr | 93.9046 | 112.9526 | 112.9526 |
| Mass Flowrate | kg/hr | 1773.416542 | 1773.412296 | 1773.412296 |
| Molar Flowrate By Component | | | | |
| 200: D-Glucose | kgmol/hr | 0 | 0 | 0 |
| 201: Cellubiose | kgmol/hr | 0.130051 | 4.408E−15 | 4.408E−15 |
| 1245: SODIUM CHLORIDE | kgmol/hr | 0 | 0 | 0 |
| 62: WATER | kgmol/hr | 42.2586 | 39.0616 | 39.0616 |
| 48: CARBON MONOXIDE | kgmol/hr | 2.08022 | 16.9496 | 16.9496 |
| 1: HYDROGEN | kgmol/hr | 24.9749 | 45.5062 | 45.5062 |
| 2: METHANE | kgmol/hr | 7.81226 | 0.002054 | 0.002054 |
| 49: CARBON DIOXIDE | kgmol/hr | 16.5541 | 11.4332 | 11.4332 |
| 65: ACETYLENE | kgmol/hr | 5.637E−12 | 1.176E−10 | 1.176E−10 |
| 40: BENZENE | kgmol/hr | 5.338E−16 | 0 | 0 |
| 3: ETHANE | kgmol/hr | 0.00007558 | 1.443E−10 | 1.443E−10 |
| 4: PROPANE | kgmol/hr | 0 | 0 | 0 |
| 22: ETHYLENE | kgmol/hr | 5.602E−07 | 1.334E−09 | 1.334E−09 |
| 1088: PHENOL | kgmol/hr | 1.121E−15 | 0 | 0 |
| 45: ETHYLBENZENE | kgmol/hr | 0 | 0 | 0 |
| 23: PROPYLENE | kgmol/hr | 2.044E−10 | 9.52E−16 | 9.52E−16 |
| 6: N-BUTANE | kgmol/hr | 7.099E−14 | 0 | 0 |
| 5: I-BUTANE | kgmol/hr | 4.108E−14 | 0 | 0 |
| 27: I-BUTENE | kgmol/hr | 1.714E−14 | 0 | 0 |
| 27: I-BUTENE | kgmol/hr | 1.714E−14 | 0 | 0 |
| 66: PROPYNE | kgmol/hr | 7.64E−15 | 1.798E−16 | 1.798E−16 |
| 3114: 2-BUTYNE | kgmol/hr | 0.094368 | 1.761E−09 | 1.761E−09 |
| Total | kgmol/hr | 93.9046 | 112.953 | 112.953 |
| Molar Composition By Component | | | | |
| 200: D-Glucose | molar % | 0 | 0 | 0 |
| 201: Cellubiose | molar % | 0.138492683 | 3.90251E−15 | 3.90251E−15 |
| 1245: SODIUM CHLORIDE | molar % | 0 | 0 | 0 |
| 62: WATER | molar % | 45.00162931 | 34.58217135 | 34.58217135 |
| 48: CARBON MONOXIDE | molar % | 2.215248241 | 15.0058874 | 15.0058874 |
| 1: HYDROGEN | molar % | 26.5960347 | 40.28773029 | 40.28773029 |
| 2: METHANE | molar % | 8.319358157 | 0.001818455 | 0.001818455 |
| 49: CARBON DIOXIDE | molar % | 17.62863587 | 10.12208618 | 10.12208618 |
| 65: ACETYLENE | molar % | 6.0029E−12 | 1.04114E−10 | 1.04114E−10 |
| 40: BENZENE | molar % | 5.68449E−16 | 0 | 0 |
| 3: ETHANE | molar % | 8.04859E−05 | 1.27752E−10 | 1.27752E−10 |
| 4: PROPANE | molar % | 0 | 0 | 0 |
| 22: ETHYLENE | molar % | 5.96563E−07 | 1.18102E−09 | 1.18102E−09 |
| 1088: PHENOL | molar % | 1.19376E−15 | 0 | 0 |
| 45: ETHYLBENZENE | molar % | 0 | 0 | 0 |
| 23: PROPYLENE | molar % | 2.17668E−10 | 8.42828E−16 | 8.42828E−16 |
| 6: N-BUTANE | molar % | 7.5598E−14 | 0 | 0 |
| 5: I-BUTANE | molar % | 4.37465E−14 | 0 | 0 |
| 27: I-BUTENE | molar % | 1.82526E−14 | 0 | 0 |
| 27: I-BUTENE | molar % | 1.82526E−14 | 0 | 0 |
| 66: PROPYNE | molar % | 8.13592E−15 | 1.59181E−16 | 1.59181E−16 |
| 3114: 2-BUTYNE | molar % | 0.10049348 | 1.55906E−09 | 1.55906E−09 |
| Total | molar % | 100 | 100 | 100 |

| | | | | |
|---|---|---|---|---|
| Stream Number | | 15 | 16 | 17 |
| Stream Name | | Strm 15 | Strm 16 | Strm 17 |
| Thermo Method Option | | GLOBAL | CHANGED | GLOBAL |
| Vapor Fraction | | 1 | 0 | 1 |
| Temperature | C. | 3.8523 | 3.8523 | 3.8523 |
| Pressure | kg/cm2 | 0.7914549 | 0.7914549 | 0.7914549 |
| Enthalpy | kcal/hr | 2003.49464 | −409399.315 | 2003.49464 |
| Entropy | kcal/K/hr | 191.0706 | −1186.391 | 191.0706 |
| Vapor Density | kg/m3 | 0.4889622 | | 0.4889622 |
| Liquid 1 Density | kg/m3 | | 1037.60562 | |
| Liquid 1 Specific Gravity | 60 F@STP | | | |
| Vapor Cp | kcal/kgmo/C. | 7.1993 | | 7.1993 |
| Vapor Cv | kcal/kgmo/C. | 5.20779 | | 5.20779 |

| STREAM SUMMARY - Cellulose | | | | |
|---|---|---|---|---|
| Liquid 1 Cp | kcal/kgmo/C. | | 18.09128 | |
| Vapor Viscosity | cP | 0.0118909 | | 0.0118909 |
| Liquid 1 Viscosity | cP | | 1.57615 | |
| Vapor Thermal Conductivity | kcal/m/hr/C. | 0.0640952 | | 0.0640952 |
| Liquid 1 Thermal Conductivity | kcal/m/hr/C. | | 0.4887219 | |
| Vapor Flowrate | m3v(NTP)/hr | 1673.04691 | | 1673.04691 |
| Liquid 1 Flowrate | m3l(NTP)/hr | | | |
| Liquid 2 Flowrate | m3l(NTP)/hr | | 182.47997 | |
| Molecular Weight | | 14.5114 | 18.0184 | 14.5114 |
| Molar Flowrate | kgmol/hr | 74.6539 | 38.2987 | 74.6539 |
| Mass Flowrate | kg/hr | 1083.332604 | 690.0812961 | 1083.332604 |
| Molar Flowrate By Component | | | | |
| 200: D-Glucose | kgmol/hr | 0 | 0 | 0 |
| 201: Cellubiose | kgmol/hr | 4.408E−15 | 1.431E−20 | 4.408E−15 |
| 1245: SODIUM CHLORIDE | kgmol/hr | 0 | 0 | 0 |
| 62: WATER | kgmol/hr | 0.76774 | 38.2936 | 0.76774 |
| 48: CARBON MONOXIDE | kgmol/hr | 16.9495 | 0.000132 | 16.9495 |
| 1: HYDROGEN | kgmol/hr | 45.5061 | 0.000297 | 45.5061 |
| 2: METHANE | kgmol/hr | 0.002054 | 2.301E−08 | 0.002054 |
| 49: CARBON DIOXIDE | kgmol/hr | 11.4285 | 0.004673 | 11.4285 |
| 65: ACETYLENE | kgmol/hr | 1.176E−10 | 3.819E−16 | 0 |
| 40: BENZENE | kgmol/hr | 0 | 0 | 0 |
| 3: ETHANE | kgmol/hr | 1.443E−10 | 2.064E−15 | 1.443E−10 |
| 4: PROPANE | kgmol/hr | 0 | 0 | 0 |
| 22: ETHYLENE | kgmol/hr | 1.334E−09 | 5.218E−14 | 1.334E−09 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 9.519E−16 | 6.283E−20 | 9.519E−16 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 1.798E−16 | 0 | 1.798E−16 |
| 3114: 2-BUTYNE | kgmol/hr | 1.761E−09 | 5.718E−15 | 1.761E−09 |
| Total | kgmol/hr | 74.6539 | 38.2987 | 74.6539 |
| Molar Composition By Component | | | | |
| 200: D-Glucose | molar % | 0 | 0 | 0 |
| 201: Cellubiose | molar % | 5.90458E−15 | 3.73642E−20 | 5.90458E−15 |
| 1245: SODIUM CHLORIDE | molar % | 0 | 0 | 0 |
| 62: WATER | molar % | 1.028399052 | 99.98668362 | 1.028399052 |
| 48: CARBON MONOXIDE | molar % | 22.70410521 | 0.000344659 | 22.70410521 |
| 1: HYDROGEN | molar % | 60.95609205 | 0.000775483 | 60.95609205 |
| 2: METHANE | molar % | 0.002751363 | 6.00804E−08 | 0.002751363 |
| 49: CARBON DIOXIDE | molar % | 15.30864429 | 0.012201459 | 15.30864429 |
| 65: ACETYLENE | molar % | 1.57527E−10 | 9.97162E−16 | 0 |
| 40: BENZENE | molar % | 0 | 0 | 0 |
| 3: ETHANE | molar % | 1.93292E−10 | 5.38922E−15 | 1.93292E−10 |
| 4: PROPANE | molar % | 0 | 0 | 0 |
| 22: ETHYLENE | molar % | 1.78691E−09 | 1.36245E−13 | 1.78691E−09 |
| 1088: PHENOL | molar % | 0 | 0 | 0 |
| 45: ETHYLBENZENE | molar % | 0 | 0 | 0 |
| 23: PROPYLENE | molar % | 1.27508E−15 | 1.64053E−19 | 1.27508E−15 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 2.40845E−16 | 0 | 2.40845E−16 |
| 3114: 2-BUTYNE | molar % | 2.35889E−09 | 1.493E−14 | 2.35889E−09 |
| Total | molar % | 100 | 100 | 100 |
| Stream Number | | 19 | 20 | 21 |
| Stream Name | | Strm 19 | Strm 20 | Strm 21 |
| Thermo Method Option | | GLOBAL | GLOBAL | CHANGED |
| Vapor Fraction | | 1 | 1 | 1 |
| Temperature | C. | 635.45059 | 260 | 260 |
| Pressure | kg/cm2 | 21.09209 | 21.08505 | 21.09209 |
| Enthalpy | kcal/hr | 366570.079 | 144383.986 | 57054.8364 |
| Entropy | kcal/K/hr | 380.4712 | 65.87408 | −92.54735 |
| Vapor Density | kg/m3 | 3.95258 | 6.72517 | 9.07162 |
| Liquid 1 Density | kg/m3 | | | |
| Liquid 1 Specific Gravity | 60 F@STP | | | |
| Vapor Cp | kcal/kgmo/C. | 8.17398 | 7.68643 | 10.81732 |
| Vapor Cv | kcal/kgmo/C. | 6.18082 | 5.67534 | 7.68247 |
| Liquid 1 Cp | kcal/kgmo/C. | | | |

STREAM SUMMARY - Cellulose

| | | | | |
|---|---|---|---|---|
| Vapor Viscosity | cP | 0.0314229 | 0.0197539 | 0.0183392 |
| Liquid 1 Viscosity | cP | | | |
| Vapor Thermal Conductivity | kcal/m/hr/C. | 0.1824967 | 0.1109855 | 0.0380113 |
| Liquid 1 Thermal Conductivity | kcal/m/hr/C. | | | |
| Vapor Flowrate | m3v(NTP)/hr | 1673.04691 | 1673.04691 | 702.22658 |
| Liquid 1 Flowrate | m3l(NTP)/hr | | | |
| Liquid 2 Flowrate | m3l(NTP)/hr | | | |
| Molecular Weight | | 14.5114 | 14.5114 | 18.0153 |
| Molar Flowrate | kgmol/hr | 74.6539 | 74.6539 | 31.3344 |
| Mass Flowrate | kg/hr | 1083.332604 | 1083.332604 | 564.4986163 |

Molar Flowrate By Component

| | | | | |
|---|---|---|---|---|
| 200: D-Glucose | kgmol/hr | 0 | 0 | 0 |
| 201: Cellubiose | kgmol/hr | 4.408E−15 | 4.408E−15 | 0 |
| 1245: SODIUM CHLORIDE | kgmol/hr | 0 | 0 | 0 |
| 62: WATER | kgmol/hr | 0.76774 | 0.76774 | 31.3344 |
| 48: CARBON MONOXIDE | kgmol/hr | 16.9495 | 16.9495 | 0 |
| 1: HYDROGEN | kgmol/hr | 45.5061 | 45.5061 | 0 |
| 2: METHANE | kgmol/hr | 0.002054 | 0.002054 | 0 |
| 49: CARBON DIOXIDE | kgmol/hr | 11.4285 | 11.4285 | 0 |
| 65: ACETYLENE | kgmol/hr | 0 | 0 | 0 |
| 40: BENZENE | kgmol/hr | 0 | 0 | 0 |
| 3: ETHANE | kgmol/hr | 1.443E−10 | 1.443E−10 | 0 |
| 4: PROPANE | kgmol/hr | 0 | 0 | 0 |
| 22: ETHYLENE | kgmol/hr | 1.334E−09 | 1.334E−09 | 0 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 9.519E−16 | 9.519E−16 | 0 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 1.798E−16 | 1.798E−16 | 0 |
| 3114: 2-BUTYNE | kgmol/hr | 1.761E−09 | 1.761E−09 | 0 |
| Total | kgmol/hr | 74.6539 | 74.6539 | 31.3344 |

Molar Composition By Component

| | | | | |
|---|---|---|---|---|
| 200: D-Glucose | molar % | 0 | 0 | 0 |
| 201: Cellubiose | molar % | 5.90458E−15 | 5.90458E−15 | 0 |
| 1245: SODIUM CHLORIDE | molar % | 0 | 0 | 0 |
| 62: WATER | molar % | 1.028399052 | 1.028399052 | 100 |
| 48: CARBON MONOXIDE | molar % | 22.70410521 | 22.70410521 | 0 |
| 1: HYDROGEN | molar % | 60.95609205 | 60.95609205 | 0 |
| 2: METHANE | molar % | 0.002751363 | 0.002751363 | 0 |
| 49: CARBON DIOXIDE | molar % | 15.30864429 | 15.30864429 | 0 |
| 65: ACETYLENE | molar % | 0 | 0 | 0 |
| 40: BENZENE | molar % | 0 | 0 | 0 |
| 3: ETHANE | molar % | 1.93292E−10 | 1.93292E−10 | 0 |
| 4: PROPANE | molar % | 0 | 0 | 0 |
| 22: ETHYLENE | molar % | 1.78691E−09 | 1.78691E−09 | 0 |
| 1088: PHENOL | molar % | 0 | 0 | 0 |
| 45: ETHYLBENZENE | molar % | 0 | 0 | 0 |
| 23: PROPYLENE | molar % | 1.27508E−15 | 1.27508E−15 | 0 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 2.40845E−16 | 2.40845E−16 | 0 |
| 3114: 2-BUTYNE | molar % | 2.35889E−09 | 2.35889E−09 | 0 |
| Total | molar % | 100 | 100 | 100 |

| | | | | |
|---|---|---|---|---|
| Stream Number | | 22 | 23 | 24 |
| Stream Name | | Strm 22 | Strm 23 | Strm 24 |
| Thermo Method Option | | GLOBAL | GLOBAL | GLOBAL |
| Vapor Fraction | | 1 | 1 | 0.8030047 |
| Temperature | C. | 256.87599 | 375.08737 | 4.4 |
| Pressure | kg/cm2 | 21.08505 | 18.62596 | 18.47098 |
| Enthalpy | kcal/hr | 201438.822 | 312069.389 | −220645.816 |
| Entropy | kcal/K/hr | 155.5943 | 348.3435 | −990.4445 |
| Vapor Density | kg/m3 | 7.32523 | 5.26004 | 11.74154 |
| Liquid 1 Density | kg/m3 | | | 1040.04221 |
| Liquid 1 Specific Gravity | 60 F@STP | | | 0.9973416 |
| Vapor Cp | kcal/kgmo/C. | 8.16233 | 8.50312 | 7.5658 |
| Vapor Cv | kcal/kgmo/C. | 6.08656 | 6.48094 | 5.45328 |

-continued

| STREAM SUMMARY - Cellulose | | | | |
|---|---|---|---|---|
| Liquid 1 Cp | kcal/kgmo/C. | | | |
| Vapor Viscosity | cP | 0.018348 | 0.0209351 | 0.0117894 |
| Liquid 1 Viscosity | cP | | | 1.54603 |
| Vapor Thermal Conductivity | kcal/m/hr/C. | 0.085113 | 0.1137605 | 0.0701938 |
| Liquid 1 Thermal Conductivity | kcal/m/hr/C. | | | 0.4903894 |
| Vapor Flowrate | m3v(NTP)/hr | 2375.27349 | 2375.27349 | 1907.35568 |
| Liquid 1 Flowrate | m3l(NTP)/hr | | | |
| Liquid 2 Flowrate | m3l(NTP)/hr | | | 100.38398 |
| Molecular Weight | | 15.5473 | 15.5473 | 15.5473 |
| Molar Flowrate | kgmol/hr | 105.9883 | 105.9883 | 105.9883 |
| Mass Flowrate | kg/hr | 1647.831897 | 1647.831897 | 1647.831897 |
| Molar Flowrate By Component | | | | |
| 200: D-Glucose | kgmol/hr | 0 | 0 | 0 |
| 201: Cellubiose | kgmol/hr | 4.408E−15 | 4.408E−15 | 4.408E−15 |
| 1245: SODIUM CHLORIDE | kgmol/hr | 0 | 0 | 0 |
| 62: WATER | kgmol/hr | 32.1021 | 20.821 | 20.8209 |
| 48: CARBON MONOXIDE | kgmol/hr | 16.9495 | 5.66831 | 5.66831 |
| 1: HYDROGEN | kgmol/hr | 45.5061 | 56.7872 | 56.7872 |
| 2: METHANE | kgmol/hr | 0.002054 | 0.002054 | 0.002054 |
| 49: CARBON DIOXIDE | kgmol/hr | 11.4285 | 22.7097 | 22.7097 |
| 65: ACETYLENE | kgmol/hr | 0 | 0 | 0 |
| 40: BENZENE | kgmol/hr | 0 | 0 | 0 |
| 3: ETHANE | kgmol/hr | 1.443E−10 | 1.443E−10 | 1.443E−10 |
| 4: PROPANE | kgmol/hr | 0 | 0 | 0 |
| 22: ETHYLENE | kgmol/hr | 1.334E−09 | 1.334E−09 | 1.334E−09 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 9.519E−16 | 9.519E−16 | 9.519E−16 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 1.798E−16 | 1.798E−16 | 1.798E−16 |
| 3114: 2-BUTYNE | kgmol/hr | 1.761E−09 | 1.761E−09 | 1.761E−09 |
| Total | kgmol/hr | 105.988 | 105.988 | 105.988 |
| Molar Composition By Component | | | | |
| 200: D-Glucose | molar % | 0 | 0 | 0 |
| 201: Cellubiose | molar % | 4.15896E−15 | 4.15896E−15 | 4.15896E−15 |
| 1245: SODIUM CHLORIDE | molar % | 0 | 0 | 0 |
| 62: WATER | molar % | 30.28842888 | 19.64467676 | 19.64458241 |
| 48: CARBON MONOXIDE | molar % | 15.99190474 | 5.348067706 | 5.348067706 |
| 1: HYDROGEN | molar % | 42.9351436 | 53.57889572 | 53.57889572 |
| 2: METHANE | molar % | 0.001937955 | 0.001937955 | 0.001937955 |
| 49: CARBON DIOXIDE | molar % | 10.78282447 | 21.42667094 | 21.42667094 |
| 65: ACETYLENE | molar % | 0 | 0 | 0 |
| 40: BENZENE | molar % | 0 | 0 | 0 |
| 3: ETHANE | molar % | 1.36147E−10 | 1.36147E−10 | 1.36147E−10 |
| 4: PROPANE | molar % | 0 | 0 | 0 |
| 22: ETHYLENE | molar % | 1.25863E−09 | 1.25863E−09 | 1.25863E−09 |
| 1088: PHENOL | molar % | 0 | 0 | 0 |
| 45: ETHYLBENZENE | molar % | 0 | 0 | 0 |
| 23: PROPYLENE | molar % | 8.98121E−16 | 8.98121E−16 | 8.98121E−16 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 1.69642E−16 | 1.69642E−16 | 1.69642E−16 |
| 3114: 2-BUTYNE | molar % | 1.66151E−09 | 1.66151E−09 | 1.66151E−09 |
| Total | molar % | 100 | 100 | 100 |

| Stream Number | | 25 | 26 | 27 |
|---|---|---|---|---|
| Stream Name | | Strm 25 | Strm 26 | Strm 27 |
| Thermo Method Option | | CHANGED | GLOBAL | GLOBAL |
| Vapor Fraction | | 0 | 1 | 1 |
| Temperature | C. | 4.39847 | 4.39847 | 4.39847 |
| Pressure | kg/cm2 | 18.46043 | 18.46043 | 18.46043 |
| Enthalpy | kcal/hr | −221779.766 | 1134.09787 | 1651.37154 |
| Entropy | kcal/K/hr | −643.5034 | −346.8443 | −255.336 |
| Vapor Density | kg/m3 | | 11.7349 | 1.56295 |
| Liquid 1 Density | kg/m3 | 1040.04201 | | |
| Liquid 1 Specific Gravity | 60 F@STP | | | |
| Vapor Cp | kcal/kgmo/C. | | 7.56569 | 6.92733 |
| Vapor Cv | kcal/kgmo/C. | | 5.45325 | 4.9238 |
| Liquid 1 Cp | kcal/kgmo/C. | 18.04647 | | |

| STREAM SUMMARY - Cellulose | | | | |
|---|---|---|---|---|
| Vapor Viscosity | cP | | 0.0117892 | 0.0086131 |
| Liquid 1 Viscosity | cP | 1.54611 | | |
| Vapor Thermal Conductivity | kcal/m/hr/C. | | 0.0701924 | 0.1437823 |
| Liquid 1 Thermal Conductivity | kcal/m/hr/C. | 0.4903864 | | |
| Vapor Flowrate | m3v(NTP)/hr | | 1907.35804 | 1018.04118 |
| Liquid 1 Flowrate | m3l(NTP)/hr | | | |
| Liquid 2 Flowrate | m3l(NTP)/hr | 100.383 | | |
| Molecular Weight | | 18.1334 | 14.9129 | 2.0159 |
| Molar Flowrate | kgmol/hr | 20.8791 | 85.1092 | 45.4265 |
| Mass Flowrate | kg/hr | 378.6090719 | 1269.224989 | 91.57528135 |
| Molar Flowrate By Component | | | | |
| 200: D-Glucose | kgmol/hr | 0 | 0 | 0 |
| 201: Cellubiose | kgmol/hr | 1.596E−19 | 4.408E−15 | 0 |
| 1245: SODIUM CHLORIDE | kgmol/hr | 0 | 0 | 0 |
| 62: WATER | kgmol/hr | 20.7773 | 0.043565 | 0 |
| 48: CARBON MONOXIDE | kgmol/hr | 0.00048 | 5.66783 | 0 |
| 1: HYDROGEN | kgmol/hr | 0.004106 | 56.7832 | 45.4265 |
| 2: METHANE | kgmol/hr | 2.447E−07 | 0.002054 | 0 |
| 49: CARBON DIOXIDE | kgmol/hr | 0.09716 | 22.6126 | 0 |
| 65: ACETYLENE | kgmol/hr | 0 | 0 | 0 |
| 40: BENZENE | kgmol/hr | 0 | 0 | 0 |
| 3: ETHANE | kgmol/hr | 2.097E−14 | 1.442E−10 | 0 |
| 4: PROPANE | kgmol/hr | 0 | 0 | 0 |
| 22: ETHYLENE | kgmol/hr | 5.284E−13 | 1.333E−09 | 0 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 4.697E−19 | 9.515E−16 | 0 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 0 | 1.797E−16 | 0 |
| 3114: 2-BUTYNE | kgmol/hr | 6.377E−14 | 1.761E−09 | 0 |
| Total | kgmol/hr | 20.8791 | 85.1092 | 45.4265 |
| Molar Composition By Component | | | | |
| 200: D-Glucose | molar % | 0 | 0 | 0 |
| 201: Cellubiose | molar % | 7.64401E−19 | 5.17923E−15 | 0 |
| 1245: SODIUM CHLORIDE | molar % | 0 | 0 | 0 |
| 62: WATER | molar % | 99.51243109 | 0.051187181 | 0 |
| 48: CARBON MONOXIDE | molar % | 0.00229895 | 6.659479821 | 0 |
| 1: HYDROGEN | molar % | 0.019665599 | 66.71805163 | 100 |
| 2: METHANE | molar % | 1.17199E−06 | 0.00241337 | 0 |
| 49: CARBON DIOXIDE | molar % | 0.465345729 | 26.56892557 | 0 |
| 65: ACETYLENE | molar % | 0 | 0 | 0 |
| 40: BENZENE | molar % | 0 | 0 | 0 |
| 3: ETHANE | molar % | 1.00435E−13 | 1.69429E−10 | 0 |
| 4: PROPANE | molar % | 0 | 0 | 0 |
| 22: ETHYLENE | molar % | 2.53076E−12 | 1.56622E−09 | 0 |
| 1088: PHENOL | molar % | 0 | 0 | 0 |
| 45: ETHYLBENZENE | molar % | 0 | 0 | 0 |
| 23: PROPYLENE | molar % | 2.24962E−18 | 1.11798E−15 | 0 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 0 | 2.11141E−16 | 0 |
| 3114: 2-BUTYNE | molar % | 3.05425E−13 | 2.06911E−09 | 0 |
| Total | molar % | 100 | 100 | 100 |

| Stream Number | | 28 | 29 | 30 |
|---|---|---|---|---|
| Stream Name | | Strm 28 | Strm 29 | Strm 30 |
| Thermo Method Option | | GLOBAL | GLOBAL | GLOBAL |
| Vapor Fraction | | 0.9994618 | 1 | 0.9979077 |
| Temperature | C. | 4.39847 | 4.39847 | 4.39847 |
| Pressure | kg/cm2 | 18.46043 | 18.46043 | 18.46043 |
| Enthalpy | kcal/hr | −2251.94686 | −4036.65963 | 114.87892 |
| Entropy | kcal/K/hr | −156.1731 | −138.7223 | −75.53467 |
| Vapor Density | kg/m3 | 24.30074 | 39.15895 | 8.31097 |
| Liquid 1 Density | kg/m3 | 1043.39783 | | 1036.9372 |
| Liquid 1 Specific Gravity | 60 F@STP | 0.9949659 | | 0.9997428 |
| Vapor Cp | kcal/kgmo/C. | 8.5313 | 10.31671 | 6.99413 |
| Vapor Cv | kcal/kgmo/C. | 6.12765 | 7.1849 | 4.95039 |

STREAM SUMMARY - Cellulose

| | | | | |
|---|---|---|---|---|
| Liquid 1 Cp | kcal/kgmo/C. | | | |
| Vapor Viscosity | cP | 0.0150956 | 0.0144267 | 0.0112137 |
| Liquid 1 Viscosity | cP | 1.54611 | | 1.54611 |
| Vapor Thermal Conductivity | kcal/m/hr/C. | 0.0353254 | 0.0165414 | 0.0772689 |
| Liquid 1 Thermal Conductivity | kcal/m/hr/C. | 0.4903864 | | 0.4903864 |
| Vapor Flowrate | m3v(NTP)/hr | 888.83821 | 506.76397 | 381.75248 |
| Liquid 1 Flowrate | m3l(NTP)/hr | | | |
| Liquid 2 Flowrate | m3l(NTP)/hr | 0.1036698 | | 0.1701677 |
| Molecular Weight | | 29.6766 | 44.0099 | 10.6895 |
| Molar Flowrate | kgmol/hr | 39.6827 | 22.6126 | 17.0701 |
| Mass Flowrate | kg/hr | 1177.647615 | 995.1782647 | 182.470834 |
| Molar Flowrate By Component | | | | |
| 200: D-Glucose | kgmol/hr | 0 | 0 | 0 |
| 201: Cellubiose | kgmol/hr | 4.408E−15 | 0 | 4.408E−15 |
| 1245: SODIUM CHLORIDE | kgmol/hr | 0 | 0 | 0 |
| 62: WATER | kgmol/hr | 0.043565 | 0 | 0.043565 |
| 48: CARBON MONOXIDE | kgmol/hr | 5.66783 | 0 | 5.66783 |
| 1: HYDROGEN | kgmol/hr | 11.3566 | 0 | 11.3566 |
| 2: METHANE | kgmol/hr | 0.002054 | 0 | 0.002054 |
| 49: CARBON DIOXIDE | kgmol/hr | 22.6126 | 22.6126 | 0 |
| 65: ACETYLENE | kgmol/hr | 0 | 0 | 0 |
| 40: BENZENE | kgmol/hr | 0 | 0 | 0 |
| 3: ETHANE | kgmol/hr | 1.442E−10 | 0 | 1.442E−10 |
| 4: PROPANE | kgmol/hr | 0 | 0 | 0 |
| 22: ETHYLENE | kgmol/hr | 1.333E−09 | 0 | 1.333E−09 |
| 1088: PHENOL | kgmol/hr | 0 | 0 | 0 |
| 45: ETHYLBENZENE | kgmol/hr | 0 | 0 | 0 |
| 23: PROPYLENE | kgmol/hr | 9.515E−16 | 0 | 9.515E−16 |
| 6: N-BUTANE | kgmol/hr | 0 | 0 | 0 |
| 5: I-BUTANE | kgmol/hr | 0 | 0 | 0 |
| 27: I-BUTENE | kgmol/hr | 0 | 0 | 0 |
| 27: I-BUTENE | kgmol/hr | 0 | 0 | 0 |
| 66: PROPYNE | kgmol/hr | 1.797E−16 | 0 | 1.797E−16 |
| 3114: 2-BUTYNE | kgmol/hr | 1.761E−09 | 0 | 1.761E−09 |
| Total | kgmol/hr | 39.6827 | 22.6126 | 17.0701 |
| Molar Composition By Component | | | | |
| 200: D-Glucose | molar % | 0 | 0 | 0 |
| 201: Cellubiose | molar % | 1.11081E−14 | 0 | 2.58229E−14 |
| 1245: SODIUM CHLORIDE | molar % | 0 | 0 | 0 |
| 62: WATER | molar % | 0.109783356 | 0 | 0.25521233 |
| 48: CARBON MONOXIDE | molar % | 14.2828739 | 0 | 33.20326184 |
| 1: HYDROGEN | molar % | 28.61851638 | 0 | 66.52919432 |
| 2: METHANE | molar % | 0.005176059 | 0 | 0.012032736 |
| 49: CARBON DIOXIDE | molar % | 56.98352179 | 100 | 0 |
| 65: ACETYLENE | molar % | 0 | 0 | 0 |
| 40: BENZENE | molar % | 0 | 0 | 0 |
| 3: ETHANE | molar % | 3.63383E−10 | 0 | 8.44752E−10 |
| 4: PROPANE | molar % | 0 | 0 | 0 |
| 22: ETHYLENE | molar % | 3.35915E−09 | 0 | 7.80898E−09 |
| 1088: PHENOL | molar % | 0 | 0 | 0 |
| 45: ETHYLBENZENE | molar % | 0 | 0 | 0 |
| 23: PROPYLENE | molar % | 2.39777E−15 | 0 | 5.57407E−15 |
| 6: N-BUTANE | molar % | 0 | 0 | 0 |
| 5: I-BUTANE | molar % | 0 | 0 | 0 |
| 27: I-BUTENE | molar % | 0 | 0 | 0 |
| 27: I-BUTENE | molar % | 0 | 0 | 0 |
| 66: PROPYNE | molar % | 4.52842E−16 | 0 | 1.05272E−15 |
| 3114: 2-BUTYNE | molar % | 4.4377E−09 | 0 | 1.03163E−08 |
| Total | molar % | 100 | 100 | 100 |

Note:
All Liquid 1 Phase calculations exclude Free Water

The purpose of this optimization was to maximize the hydrogen production, minimize the need for electric grid power to operate the plant, and produce dry ice (liquid carbonic) product. The feedstock in this example is the dimer of cellulose, called cellubiose. This dimer portion of the large cellulose chain is replicated some 25,000 to 250,000 times.

The biomass enters the rotary kiln steam reformer as a solid and/or liquid phase together with the recycle gases. Within the kiln this mixture is heated, volatiles are vaporized, solids are chemically broken and decomposed, and the mixture is further heated as it moves from left to right through the kiln. At the end of the kiln, solids are removed. These solids are about 15% (by mass) of the biomass feed. With an agricultural or forest biomass feedstock, this solid product stream is a valuable freely-flowing, gravel-like, slow-release form of phosphorus/potassium fertilizer. The gases generated inside the kiln react with the water that enters with the biomass and with any additional water that comes with the recycle stream. The steam/carbon dioxide reforming chemical reaction is endothermic (it requires supplying energy) and occurs as the key step in the process generating a syngas stream consisting of hydrogen, carbon monoxide, carbon dioxide, water and other light gases, such as methane, ethane, ethylene, etc.

The hot syngas leaving the rotary kiln is heated, mixed with hot superheated steam, and enters the vertical steam reformer where it is further heated to complete the steam/carbon dioxide reforming reaction producing the highest concentration of hydrogen with the least amount of other organic contaminants, such as higher hydrocarbons and aromatics.

Intellergy's system addresses biomass phase-change as a solid-to-vapor chemical decomposition. The biomass is decomposed into a vapor by breaking the chemical bonds. This process is not the classical solid-to-liquid transition (heat of melting), or the liquid-to-vapor transition (heat of vaporization).

As these molecular fragments move through the kiln, the temperature increases, causing further decomposition by the hydroxyl radical attacking and breaking the next stronger bond, such as carbon-carbon bonds. The last and toughest bonds to be attacked are the aromatic carbon-carbon bonds. This decomposition results in the aromatic ring coming apart which creates other organic gases such as ethane, ethylene and butyne. Small amounts of these gases can recombine to form other very stable aromatic compounds.

This very hot syngas leaving the steam reformer passes through heat exchangers to recover energy to supply heat to processing equipment or to generate steam for process use and/or power generation. The cool hydrogen-rich syngas is passed to the hydrogen purification section, shown in the on the right-hand portion of the graphic in FIG. 2, where the carbon monoxide is reacted with more superheated steam to form carbon dioxide and additional hydrogen as well as release of heat. This rich hydrogen gas mixture is purified in a commercial pressure swing adsorption unit yielding a high purity hydrogen stream ranging from 99.9% to 99.99% purity. The remaining carbon dioxide and other light gases pass overhead into the carbon dioxide recovery system. Here a clean carbon dioxide stream is produced that feeds a commercial carbon dioxide liquefaction plant where either liquid carbon dioxide (liquid carbonic) or dry ice is produced. The remaining light gases are recycled to the kiln.

Referring to FIG. 7 the simulation modules M-1, H-2, H-20, S-4, and R-3 model the commercial rotary kiln. M-1 mixes the feed biomass with the recycle gases adiabatically. The H-20 module preheats the recycle gas while the H-2 module adds enough heat to the material leaving M-1 to change its phase to a vapor and heat it to 400 to 500° C. Module S-4 removes the freely-flowing granular residue, 15% of the biomass on a dry basis, which is formed in the rotary kiln. This residue is high in carbon content. R-3 calculates the equilibrium vapor composition using Gibbs Free Energy minimization isothermally at 400 to 500° C. The heat added to the commercial kiln is supplied by recovered process heat and trimmed with electric heat to control the reaction temperature at 400° to 500° C.

Simulation modules M-5, H-6, and R-7 model the commercial steam reformer. M-5 mixes the product from the rotary kiln at 1 atmosphere with superheated steam added at 300 PSIA and 267° C. Module H-6 heats the steam reformer feed to around 875° C. The steam reformer, R-7, is modeled as an isothermal reactor. The heat added to the commercial steam reformer is supplied by recovered process heat and trimmed with electric heat to control the reaction temperature at around 875° C.

Module X-8 models a commercial heat exchanger cooling the steam reformer effluent while recovering energy to be returned to the process. Water is condensed and removed in module F-9 which models a commercial vapor liquid separator. The vapor leaving F-9 flows through module S-10, a commercial carbon bed adsorber, where small amounts of aromatic organic compounds are removed. The vapor leaving S-10 flows to C-11, a 3-stage compressor that increases the process pressure to 300 PSIA. Heat exchanger module X-14 removes the heat of compression cooling the vapor to 260° C. In practice, X-14 models the compressor first and second stage intercoolers and the 3 stage after-cooler.

M-12 mixes the vapor from C-11 with superheated steam and the combined flow enters the carbon monoxide shift converter, R-13. The shift converter is modeled as an adiabatic reactor. This reactor converts water and carbon monoxide to desired carbon dioxide and hydrogen products. Energy is recovered in heat exchanger, X-15. This energy is returned back to the process. The water that condenses in X-15 is removed in vapor-liquid separator F-16. The vapor from separator, F-16, flows to a pressure swing adsorption unit where 80% of the hydrogen leaving F-16 is recovered as product with 99.9% purity. The remaining vapor leaving the pressure swing adsorption unit flows to the carbon dioxide recovery system, module S-18. S-18 models the carbon dioxide recovery system as a simple separation device. In practice this equipment could be a membrane system or an amine system with a liquid carbonic and/or dry ice production unit. The vapor leaving S-18 flows to heater, H-20, preheating the vapor prior to feeding the rotary kiln.

A significant advantage of this process configuration with the major recycle loop carrying the unconverted hydrogen and other light gases from the PSA unit, is that these gases are further converted in the steam/$CO_2$ reforming units to make more hydrogen product, as required in the mass balance dictating that the hydrogen coming in with the feedstock must leave the process as the hydrogen product. Additional or higher conversion stages in the PSA unit are not needed when this recycle loop is used.

To validate the process simulation predictions, a biomass sample of grape pomace, available in huge quantity from the wine industry, was test-run in a pilot unit as illustrated in FIG. 2, less the hydrogen purification and liquid carbonic steps, to produce the syngas stream. This measured syngas stream was compared with WinSim's Design-2 process simulation prediction below in Table 1.

Comparison of Pomace Produced Syngas with Simulation Results

TABLE 1

| Component | Test Results | Simulation Prediction |
|---|---|---|
| Hydrogen | 59.4% | 61.4% |
| Oxygen + Argon* | 0% | |
| Nitrogen* | 0% | |
| Carbon Monoxide | 32.4% | 31.3% |
| Carbon Dioxide | 2.96% | 6.2% |
| Methane | 5.1% | |
| Ethane, acetylene, ethylene | 570 ppm | <940 ppm |
| Propane** | 98 ppm | |
| Butanes** | 60 ppm | |
| Benzene** | 198.4 ppm | 1 ppb |
| C7 and above** | 380 ppm | |
| Hydrogen Sulfide** | 59.8 ppm | |
| Carbonyl Sulfide** | 1.74 ppm | |

TABLE 1-continued

| Component | Test Results | Simulation Prediction |
|---|---|---|
| Methyl Mercaptan** | 16.6 ppm | |
| Carbon Disulfide** | 35.3 ppm | |

*Air leakage accounted for.
**In practice, these components will be removed by a zinc bed, carbon bed or are recycled to the kiln The comparison of the test results and the simulation prediction of syngas is excellent. The kiln and steam/$CO_2$ reformer chemical reactors' process temperatures and steam content, in the simulation, match those of the pilot demonstration.

The energy balance was completed in order to identify where heat sources in the process can be used to provide the endothermic heat needed for the steam reforming chemistry discussed above. In the table below, it can be seen that the largest heat requirement is for the steam/$CO_2$ reforming kiln R-3 via heater H-2. The second stage steam/$CO_2$ reformer R-7 is supplied by induction heaters or by DC electrical resistance heat estimated at about 600 kW. For a 20 dry ton/day feedstock plant, this heat requirement is around 1200 kWt. This can be supplied by heat exchange-recovering heat in X-8 from the very hot syngas leaving the second stage steam/$CO_2$ reformer R-7, which is about 1200 kW. There is also heat available in X-15 from the exothermic CO shift unit that further enhances the hydrogen production where this heat can be used to drive a boiler to make the steam needed for the process. In this way, only a small amount of grid electricity around 560-760 kW is needed to drive the plant.

TABLE 5

Process Power Requirements Summary

| | Cellobiose | Pomace |
|---|---|---|
| | Chemical Formula | |
| | C12—H22—O11 KW | C12—H16—O6 KW |
| Inputs | | |
| Rotary Kiln | 1189.41 | 1268.32 |
| Steam Reformer | 601.36 | 628.71 |
| Compressors | 207.12 | 276.21 |
| Boiler | 392.84 | 531.78 |
| Product Purification | 18.64 | 18.64 |
| Outputs | | |
| X-8 | 1292.01 | 1221.88 |
| X-15 | 561.69 | 756.70 |
| Total Power Load | 555.67 | 745.07 |
| Hydrogen Production, Kg/Hr | 93.86 | 131.42 |
| Carbon Dioxide Production, Kg/Hr | 1020.22 | 1319.61 |
| Power Demand, KW/Kg Hydrogen | 5.92 | 5.67 |

The heat sources and heat demands are shown in Table 5 comparing cellulose (cellubiose dimer) and grape pomace winery waste. And they are very comparable.

What is claimed is:

1. A system for converting carbonaceous waste into energy comprising:
   (a) a rotary kiln for converting a carbonaceous waste in the presence of steam and $CO_2$ to synthesis gas having an inlet for the waste, an outlet for the synthesis gas and a solids exit between said inlet and said outlet and containing a primary region having an auger to move the waste therethrough, and a second region for steam/$CO_2$ reforming of the off-gases generated in the primary region to the synthesis gas;
   (b) an exothermic chemical reactor for converting at least a portion of the synthesis gas from said rotary kiln to steam, a carbon-sequestering product, and an exhaust gas stream, and having a gas inlet in fluid communication with the synthesis gas from said kiln, and an exit for said steam and an exit for said carbon-sequestering product; and
   (c) recycle line for recycling the exhaust gas stream containing hydrogen, CO and greenhouse gases selected from the group consisting of CHsub4, $CO_2$ and mixtures thereof from said exothermic reactor to the inlet of said kiln.

2. The system of claim 1, wherein said kiln includes an internal annular region having spiral vanes to carry out a cyclonic separation of entrained solids.

3. The system of claim 1, wherein said kiln includes a high-temperature porous ceramic filter to further remove entrained solids.

4. The system of claim 1 wherein said exothermic reactor is a Fischer-Tropsch reactor.

5. The system of claim 1 wherein said exothermic reactor is a methanol synthesis reactor.

6. The system of claim 1 wherein said exothermic reactor is a methanation reactor.

7. The system of claim 1 which further comprises a shift converter having an inlet receiving a gas stream from said kiln and an outlet in fluid communication with the inlet of said kiln.

8. The system of claim 1 wherein said exothermic reactor includes a catalyst.

9. The system of claim 8 wherein said exothermic reactor contains a catalyst that is not sensitive to impurities in the synthesis gas.

10. The system of claim 8 wherein said auger includes a hollow flight screw and the synthesis gas is recycled through the hollow flight screw.

11. The system of claim 1 wherein the off-gases are sent to the second region that serves as a separate reforming unit.

* * * * *